(12) United States Patent
Ono

(10) Patent No.: US 11,057,477 B2
(45) Date of Patent: Jul. 6, 2021

(54) METHOD FOR PROVIDING WEB SERVICE, RECORDING MEDIUM RECORDING PROGRAM FOR PROVIDING WEB SERVICE, AND SERVER APPARATUS

(71) Applicant: CASIO COMPUTER CO., LTD., Tokyo (JP)

(72) Inventor: Manato Ono, Wako (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/387,001

(22) Filed: Apr. 17, 2019

(65) Prior Publication Data

US 2019/0320028 A1 Oct. 17, 2019

(30) Foreign Application Priority Data

Apr. 17, 2018 (JP) .............................. JP2018-079394

(51) Int. Cl.
*G06F 15/16* (2006.01)
*H04L 29/08* (2006.01)
(Continued)

(52) U.S. Cl.
CPC ............ *H04L 67/146* (2013.01); *H04L 61/30* (2013.01); *H04L 63/0421* (2013.01);
(Continued)

(58) Field of Classification Search
CPC ... H04L 67/146; H04L 61/30; H04L 63/0421; H04L 67/141; H04L 67/16; H04L 67/42
(Continued)

(56) References Cited

U.S. PATENT DOCUMENTS

2002/0184041 A1* 12/2002 Muller ............... G06Q 30/0203
705/7.32
2004/0107131 A1* 6/2004 Wilkerson ............. G06Q 10/10
705/7.29
(Continued)

FOREIGN PATENT DOCUMENTS

JP H08036354 A 2/1996
JP 2002-116683 A 4/2002
(Continued)

OTHER PUBLICATIONS

University of Southampton. "Viewing Test or Survey Results in Blackboard". Sep. 25, 2015 (and others). pp. 1-40. (Year: 2015).*
(Continued)

*Primary Examiner* — Imad Hussain
(74) *Attorney, Agent, or Firm* — Scully Scott Murphy & Presser

(57) ABSTRACT

A method includes creating information indicating a first content in response to an operation on a first client terminal, assigning a unique first address on a network to the first content, permitting access to the first address from a second client terminal, which is anonymous, and on which an authentication process with an ID is not performed, editing the first content assigned with the first address, in response to an operation on the second client terminal, storing, in a storage, information on a second content corresponding to the second client terminal as and obtained based on the edited first content, and creating a unique second address on the network to the second content.

18 Claims, 24 Drawing Sheets

HOMEWORK SUBMISSION MANAGEMENT TABLE 140

| SUBMISSION ID | HOMEWORK ID | STATUS | URL | NAME | HOMEWORK MANAGEMENT PASSWORD |
|---|---|---|---|---|---|
| S-83201 | H-1031 | SUBMITTED | http://abcde.net/H-1031/S-83201 | AAA | ****** |
| S-83202 | H-1031 | SAVED | http://abcde.net/H-1031/S-83202 | | ****** |
| S-83203 | H-1031 | SUBMITTED | http://abcde.net/H-1031/S-83203 | BBB | ****** |

(51) Int. Cl.
  *H04L 29/12* (2006.01)
  *H04L 29/06* (2006.01)
(52) U.S. Cl.
  CPC ............ *H04L 67/141* (2013.01); *H04L 67/16* (2013.01); *H04L 67/42* (2013.01)
(58) Field of Classification Search
  USPC ......................................................... 709/203
  See application file for complete search history.

(56) References Cited

U.S. PATENT DOCUMENTS

| | | | |
|---|---|---|---|
| 2005/0130110 A1* | 6/2005 | Gosling | G09B 7/00 434/322 |
| 2008/0215356 A1* | 9/2008 | Vancho | G06Q 10/10 703/3 |
| 2013/0004933 A1* | 1/2013 | Bhaskaran | G09B 7/00 434/362 |
| 2015/0006652 A1* | 1/2015 | Tonks | G06Q 10/107 709/206 |
| 2015/0324445 A1* | 11/2015 | Tseng | G06F 16/285 726/28 |
| 2017/0053318 A1* | 2/2017 | Cullen | G06Q 30/0269 |
| 2017/0193848 A1* | 7/2017 | Bonney-Ache | H04L 51/14 |
| 2017/0228746 A1* | 8/2017 | Morita | G06Q 30/0203 |

FOREIGN PATENT DOCUMENTS

| | | |
|---|---|---|
| JP | 2003-141029 A | 5/2003 |
| JP | 2014-108215 A | 6/2014 |

OTHER PUBLICATIONS

Moodle. "Adding/editing a questionnaire". Jan. 30, 2018. https://docs.moodle.org/39/en/Adding/editing_a_questionnaire . pp. 1-6. (Year: 2018).*

European Search Report dated Aug. 28, 2019 in European Patent Application No. 19 16 9448.8.

* cited by examiner

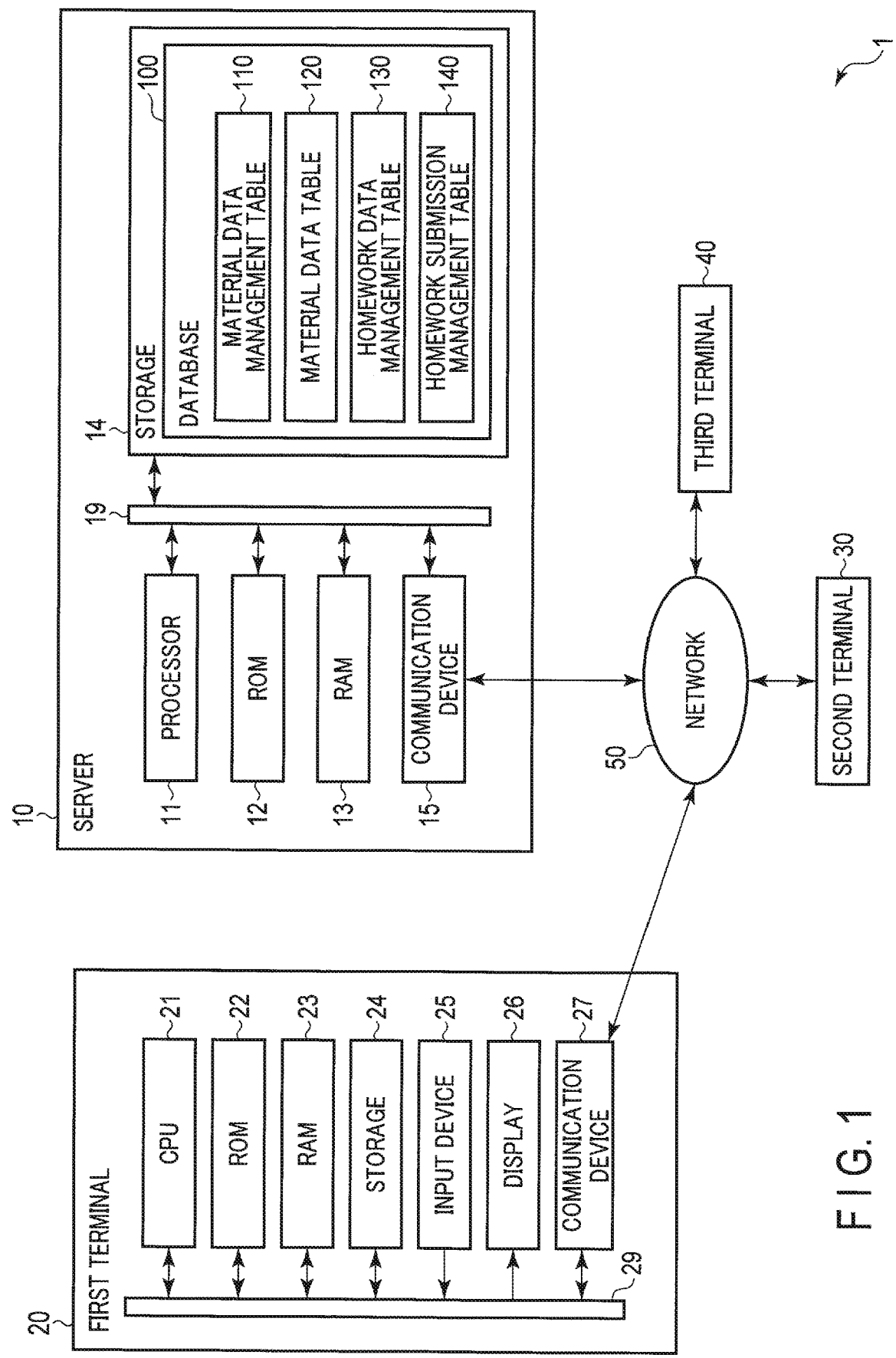
F I G. 1

MATERIAL DATA MANAGEMENT TABLE

| DATA ID | TEACHER ID | MATERIAL ID | STATE | PUBLICATION URL |
|---------|------------|-------------|-------------|------------------------|
| 3282    | T0001      | T0001-1     | UNPUBLISHED |                        |
| 8472    | T0001      | T0001-2     | HOMEWORK    |                        |
| 10832   | T0001      | T0001-3     | PUBLISHED   | http://abcde.net/T0001-3 |

F I G. 5A

MATERIAL DATA MANAGEMENT TABLE 130

| HOMEWORK ID | MATERIAL ID | DEADLINE | URL | PASSWORD |
|---|---|---|---|---|
| H-1031 | T0001-2 | YYYY/MM/DD | http://abcde.net/H-1031 | ****** |
| H-1032 | ... | ... | ... | ... |
| H-1033 | ... | ... | ... | ... |

F I G. 5B

HOMEWORK SUBMISSION MANAGEMENT TABLE 140

| SUBMISSION ID | HOMEWORK ID | STATUS | URL | NAME | HOMEWORK MANAGEMENT PASSWORD |
|---|---|---|---|---|---|
| S-83201 | H-1031 | SUBMITTED | http://abcde.net/H-1031/S-83201 | AAA | ****** |
| S-83202 | H-1031 | SAVED | http://abcde.net/H-1031/S-83202 | | ****** |
| S-83203 | H-1031 | SUBMITTED | http://abcde.net/H-1031/S-83203 | BBB | ****** |

F I G. 5C

MATERIAL DATA TABLE

| NOTE ID | MATERIAL ID/ SUBMISSION ID | DATA TYPE | DATA CONTENTS | HOMEWORK EDITABILITY FLAG |
|---|---|---|---|---|
| S0001 | T0001-1 | MEMO | {string: 'TEACHER T0001'S MATERIAL'} | - |
| S0002 | T0001-1 | EQUATION | {equation: 'y=x^3+x'} | - |
| S0003 | T0001-1 | GRAPH | {equation: 'y=x^3+x'} | - |
| S0004 | T0001-2 | MEMO | {string: 'HOMEWORK: DRAW GRAPH OF CUBIC FUNCTION THAT HAS ONLY ONE REAL ROOT'} | NON-EDITABLE |
| S0005 | S-83201 | MEMO | {string: 'HOMEWORK: DRAW GRAPH OF CUBIC FUNCTION THAT HAS ONLY ONE REAL ROOT', ...} | NON-EDITABLE |
| S0006 | S-83201 | GRAPH | {equation: 'x^3+5x^2+3x+1', ...} | - |
| S0007 | S-83202 | MEMO | {string: 'HOMEWORK: DRAW GRAPH OF CUBIC FUNCTION THAT HAS ONLY ONE REAL ROOT', ...} | NON-EDITABLE |
| S0008 | S-83202 | GRAPH | {equation: 'x^3-2x^2+10x-1', ...} | - |

F I G. 5D

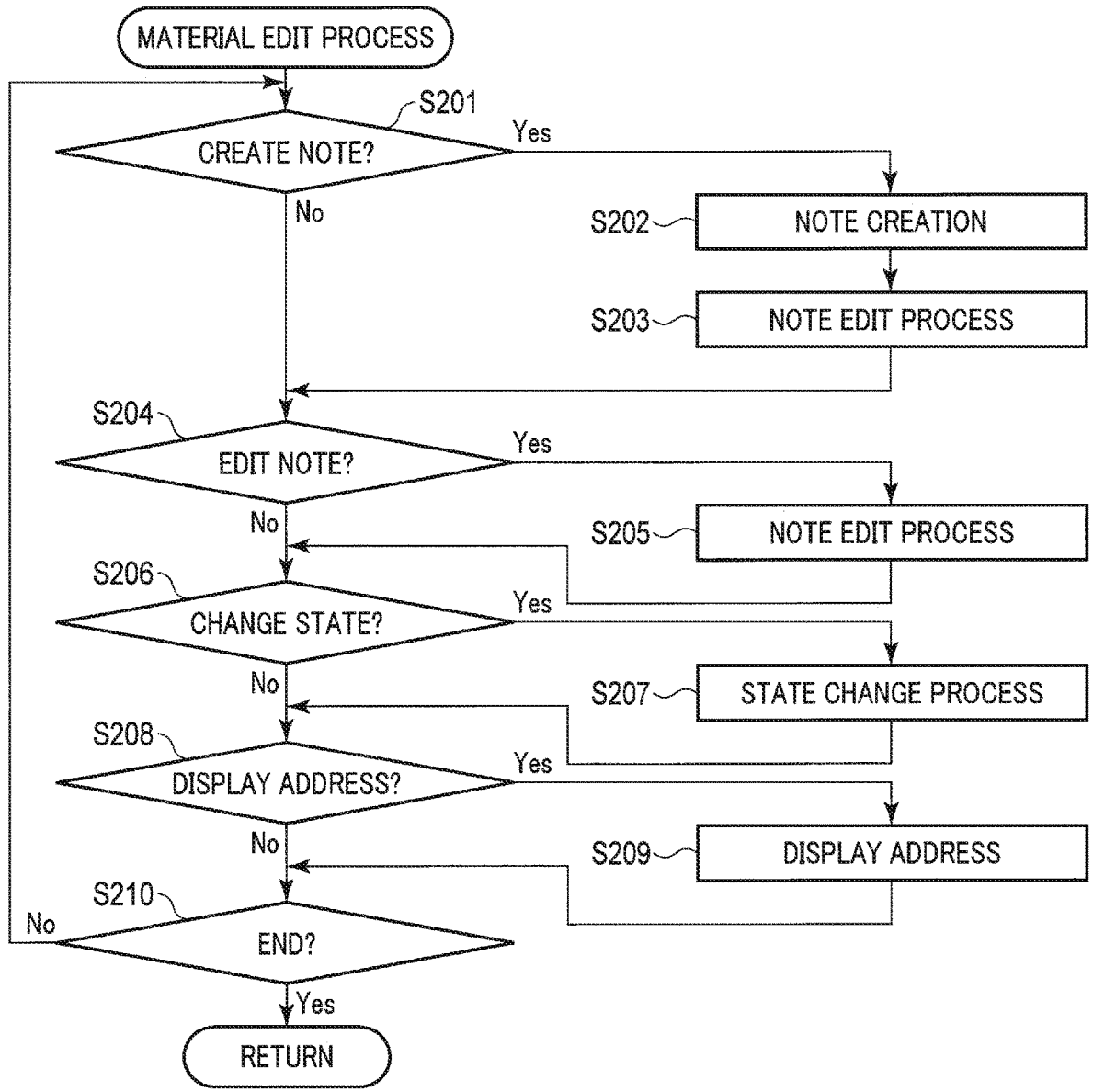
F I G. 7

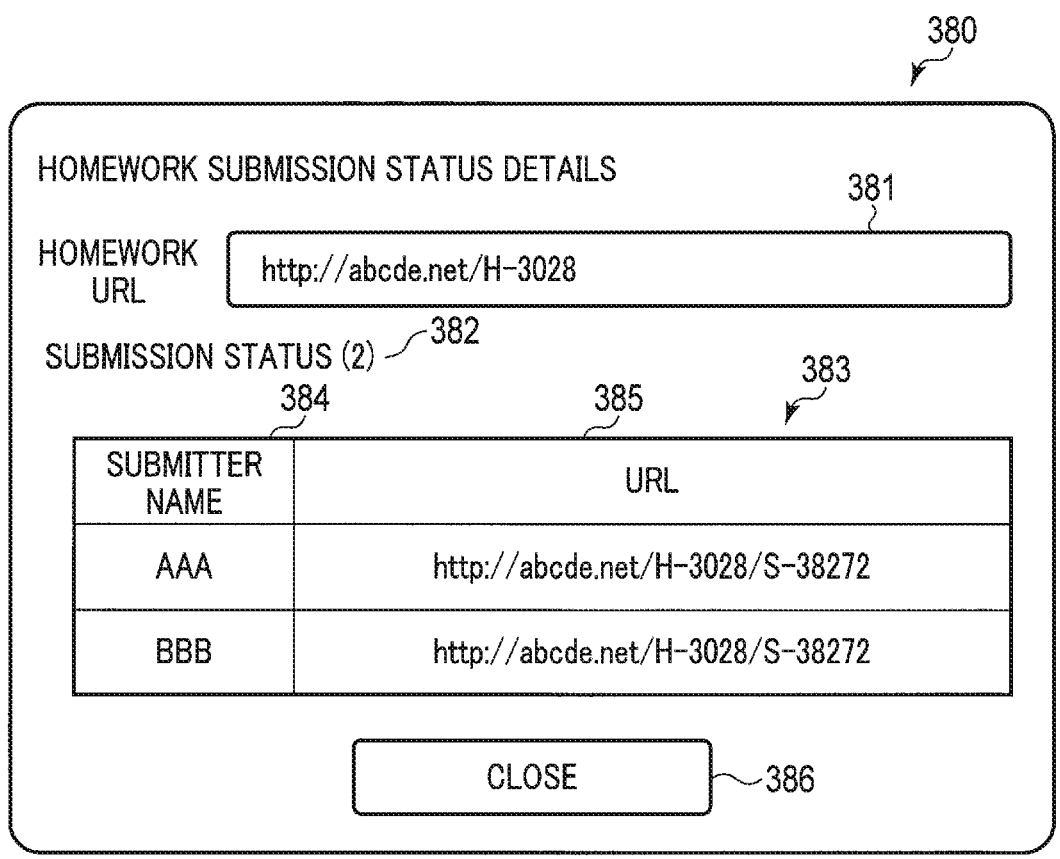
F I G. 15

MATERIAL DATA MANAGEMENT TABLE 110

| DATA ID | TEACHER ID | MATERIAL ID | STATE | PUBLICATION URL |
|---|---|---|---|---|
| 10283 | T0001 | T0001-1 | HOMEWORK | |

HOMEWORK DATA MANAGEMENT TABLE 130

| HOMEWORK ID | MATERIAL ID | DEADLINE | URL | PASSWORD |
|---|---|---|---|---|
| H-3028 | T0001-1 | YYYY/MM/DD | http://abcde.net/H-3028 | ****** |

HOMEWORK SUBMISSION MANAGEMENT TABLE 140

| SUBMISSION ID | HOMEWORK ID | STATUS | URL | NAME | HOMEWORK PASSWORD |
|---|---|---|---|---|---|
| | | | | | |

MATERIAL DATA TABLE 120

| NOTE ID | MATERIAL ID/ SUBMISSION ID | DATA TYPE | DATA CONTENTS | HOMEWORK EDITABILITY FLAG |
|---|---|---|---|---|
| S0001 | T0001-1 | MEMO | {string: "HOMEWORK: DRAW GRAPH OF CUBIC FUNCTION THAT HAS ONLY ONE REAL ROOT"} | NON-EDITABLE |

MATERIAL DATA MANAGEMENT TABLE 110

| DATA ID | TEACHER ID | MATERIAL ID | STATE | PUBLICATION URL |
|---|---|---|---|---|
| 10283 | T0001 | T0001-1 | HOMEWORK | |

HOMEWORK DATA MANAGEMENT TABLE 130

| HOMEWORK ID | MATERIAL ID | DEADLINE | URL | PASSWORD |
|---|---|---|---|---|
| H-3028 | T0001-1 | YYYY/MM/DD | http://abcde.net/H-3028 | ****** |

HOMEWORK SUBMISSION MANAGEMENT TABLE 140

| SUBMISSION ID | HOMEWORK ID | STATUS | URL | NAME | HOMEWORK PASSWORD |
|---|---|---|---|---|---|
| S-83201 | H-3028 | SUBMITTED | http://abcde.net/H-3028/S-83201 | AAA | ****** |
| S-83202 | H-3028 | SAVED | http://abcde.net/H-3028/S-83202 | | ****** |

MATERIAL DATA TABLE 120

| NOTE ID | MATERIAL ID/ SUBMISSION ID | DATA TYPE | DATA CONTENTS | HOMEWORK EDITABILITY FLAG |
|---|---|---|---|---|
| S0001 | T0001-1 | MEMO | {string: 'HOMEWORK: DRAW GRAPH OF CUBIC FUNCTION THAT HAS ONLY ONE REAL ROOT'} | NON-EDITABLE |
| S0002 | S-83201 | MEMO | {string: 'HOMEWORK: DRAW GRAPH OF CUBIC FUNCTION THAT HAS ONLY ONE REAL ROOT'} | NON-EDITABLE |
| S0003 | S-83201 | GRAPH | {equation: 'x^3+5x^2+3x+1', ...} | NON-EDITABLE |
| S0004 | S-83202 | MEMO | {string: 'HOMEWORK: DRAW GRAPH OF CUBIC FUNCTION THAT HAS ONLY ONE REAL ROOT'} | NON-EDITABLE |
| S0005 | S-83202 | MEMO | {string: 'ANSWER TO HOMEWORK BY TOMORROW'} | - |

MATERIAL DATA MANAGEMENT TABLE 110

| DATA ID | TEACHER ID | MATERIAL ID | STATE | PUBLICATION URL |
|---|---|---|---|---|
| 89327 | G0001 | G0001-1 | HOMEWORK | |

HOMEWORK DATA MANAGEMENT TABLE 130

| HOMEWORK ID | MATERIAL ID | DEADLINE | URL | PASSWORD |
|---|---|---|---|---|
| H-83279 | G0001-1 | YYYY/MM/DD | http://abcde.net/H-83279 | ****** |

F I G. 19

MATERIAL DATA MANAGEMENT TABLE 510

| DATA ID | MATERIAL ID | STATE | PUBLICATION URL | TEACHER'S PASSWORD |
|---|---|---|---|---|
| 89327 | G0001-1 | HOMEWORK | | ****** |

HOMEWORK DATA MANAGEMENT TABLE 530

| HOMEWORK ID | MATERIAL ID | DEADLINE | URL | STUDENT'S PASSWORD |
|---|---|---|---|---|
| H-83279 | G0001-1 | YYYY/MM/DD | http://abcde.net/H-83279 | ****** |

F I G. 22

METHOD FOR PROVIDING WEB SERVICE, RECORDING MEDIUM RECORDING PROGRAM FOR PROVIDING WEB SERVICE, AND SERVER APPARATUS

CROSS-REFERENCE TO RELATED APPLICATIONS

This application is based upon and claims the benefit of priority from prior Japanese Patent Application No. 2018-079394, filed Apr. 17, 2018, the entire contents of which are incorporated herein by reference.

BACKGROUND

1. Technical Field

The technical field relates to a method for providing a web service, a recording medium recording a program for providing the web service, and a server apparatus.

2. Description of Related Art

Various web-based services are already known. For example, Jpn. Pat. Appln. KOKAI Publication No. 2014-108215 discloses a web-based golf navigation service. In this service, a login ID and a password are transmitted to a management server via a terminal device carried by a golf player. Upon receiving the login ID and the password, the management server obtains corresponding booking information based on the login ID, the password, and information on the date of receipt; extracts information on the name of the player from the booking information; and transmits the extracted information to the terminal unit. If a request to transmit the name of an accompanying person is received, the management server extracts information on the name of the accompanying person from the booking information and transmits the extracted information to the terminal device. Thereby, the name of the player and the name of the accompanying person are automatically input to a scorecard.

Typically, a web service that uses information stored on a server uses IDs, etc. for identifying the individual users. On the other hand, for web services used in educational institutions, it may not be desirable to use IDs, etc. for identifying the individual users, from the viewpoint of protecting personal information of users (in particular, students). Thus, there is a demand for a web service that can be used by users who are not assigned with IDs, etc. for identifying the individual users.

BRIEF SUMMARY

According to an aspect, there is provided a method performed by a system comprising one or more first client terminals and one or more second client terminals connected to a network, the method comprising: creating information indicating one or more first contents, in response to an operation on one of the first client terminals; assigning a unique first address on the network to one of the first contents; permitting access to the unique first address from one of the second client terminals, which is anonymous, and on which an authentication process with an ID that identifies a user who uses a web service is not performed; editing the one of the first contents assigned with the unique first address, in response to an operation on the one of the second client terminals; storing, in a storage, information on the edited one of the first contents as information on one second content corresponding to the one of the second client terminals among one or more second contents corresponding to the one or more second client terminals; and assigning a unique second address on the network to the one of the second contents.

According to an aspect, there is provided a method of providing a web service executed by a server apparatus, the method comprising: causing the server apparatus to perform: transmitting a first computer-readable program as a first controller to each of one or more first client terminals capable of communicating with the server apparatus via a network; transmitting a second computer-readable program as a second controller to each of one or more second client terminals capable of communicating with the server apparatus via the network; in response to determining that information indicating one or more first contents has been created by the first controller in response to an operation on one of the first client terminals, assigning one of the first contents with a unique first address on the network; permitting an access to the unique first address from one of the second client terminals which is anonymous and on which an authentication process with an ID that identifies a user who uses the web service is not performed; in response to determining that the one of the first contents assigned with the unique first address has been edited by the second controller in response to an operation on the one of the second client terminals, storing, in a storage, information on one of the second contents corresponding to the one of the second client terminals and obtained based on the edited one of the first contents; and creating a unique second address on the network to the one of the second contents.

According to an aspect, there is provided a non-transitory recording medium having a computer-readable program recorded thereon, the program causing one or more processor of an information processing apparatus to perform: transmitting, via a network, a first computer-readable program as a first controller to each of one or more first client terminals capable of communicating with the information processing apparatus; transmitting a second computer-readable program as a second controller to each of one or more second client terminals capable of communicating with the information processing apparatus via the network; in response to determining that information indicating one or more first contents, based on which one or more second contents are respectively obtained, has been created by the first controller in response to an operation on one of the first client terminals, assigning one of the first contents with a unique first address on the network; permitting access to the unique first address from one of the second client terminals, which is anonymous, and on which an authentication process with an ID that identifies a user who uses a web service is not performed; in response to determining that the one of the first contents assigned with the unique first address has been edited by the second controller in response to an operation on the one of the second client terminals, storing, in a storage, information on one of the second contents corresponding to the one of the second client terminals and obtained based on the edited one of the first contents; and creating a unique second address on the network to the one of the second contents.

According to an aspect, there is provided a server apparatus which is capable of providing a web service executed on a network, the server comprising one or more processors configured to: transmit a first computer-readable program as a first controller to each of one or more first client terminals capable of communicating with the server apparatus via a network; transmit a second computer-readable program as a second controller to each of one or more second client terminals capable of communicating with the server apparatus via the network; in response to determining that information indicating one or more first contents, based on which one or more second contents are respectively obtained, has been created by the first controller in response to an operation on one of the first client terminals, assign one of the first contents with a unique first address on the network; permit an access to the unique first address from one of the second client terminals which is anonymous and on which an authentication process with an ID that identifies a user who uses the web service is not performed; store, in a storage, information on one of the second contents corresponding to the one of the second client terminals and obtained based on the edited one of the first contents, in response to determining that the one of the first contents assigned with the unique first address has been edited by the second controller in response to an operation on the one of the second client terminals; and create a unique second address on the network to the one of the second contents.

BRIEF DESCRIPTION OF THE DRAWINGS

The components in the drawings are not necessarily to scale relative to each other.

FIG. 1 is a block diagram schematically showing a configuration example of a teaching material system in which a web application is run, according to an embodiment.

FIG. 5A is a diagram showing a configuration example of a material data management table.

FIG. 5B is a diagram showing a configuration example of a homework data management table.

FIG. 5C is a diagram showing a configuration example of a homework submission management table.

FIG. 5D is a diagram showing a configuration example of a material data table.

FIG. 7 is a flowchart showing an example of a material edit process on the teacher side.

FIG. 15 is a diagram showing an example of a submission status detail screen displayed on the teacher's terminal.

FIG. 16A is a diagram showing an example of information contained in a database in which only homework data is present.

FIG. 16B is a diagram showing an example of information contained in a database in which homework answer data is present.

FIG. 19 is a diagram showing an example of information on a teaching material created with the guest ID.

FIG. 22 is a diagram showing an example of information on a teaching material created by a teacher without an account.

DETAILED DESCRIPTION

Figure 2:
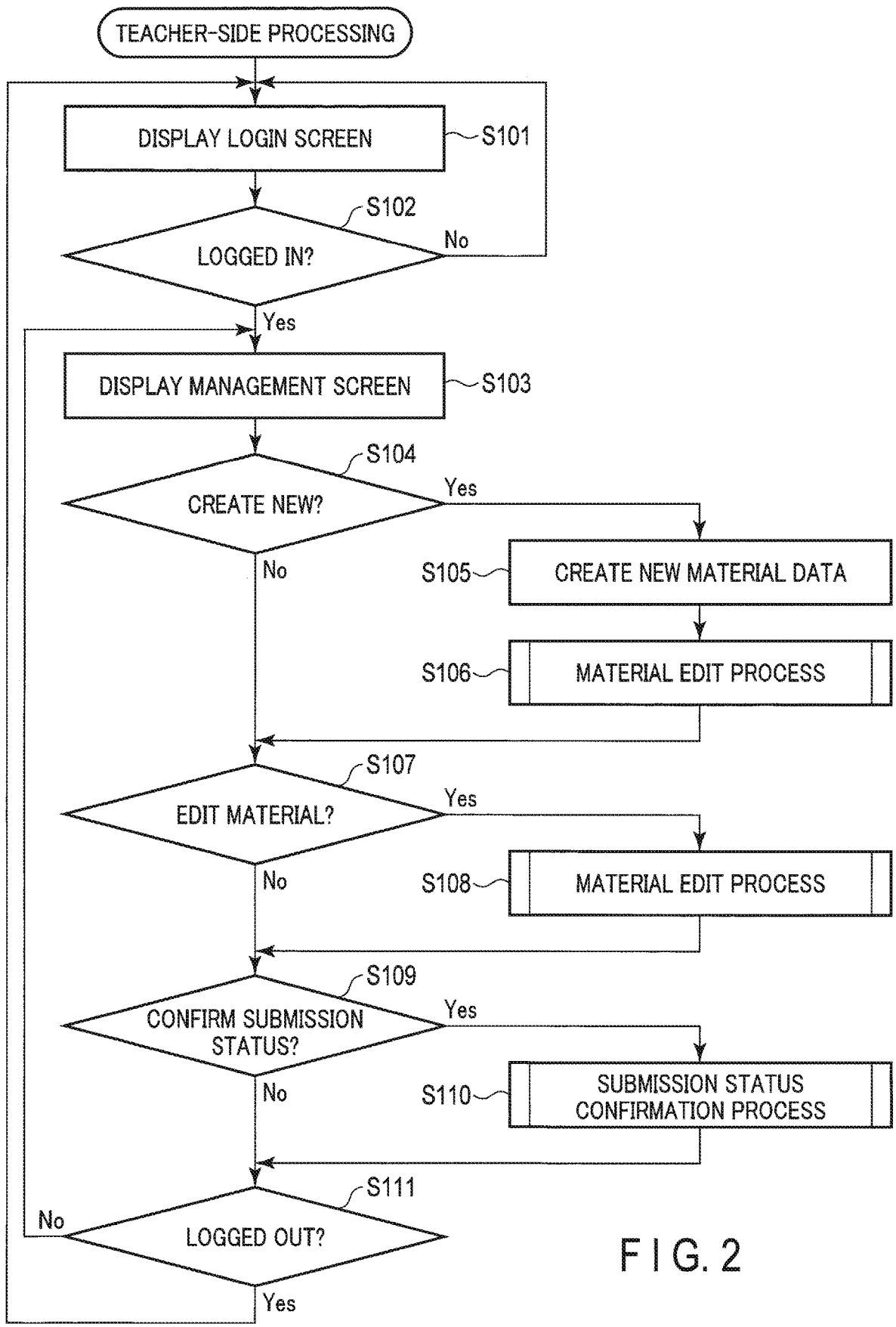
FIG. 2 is a flowchart showing an example of teacher-side processing of the web application.

An embodiment of the present invention will be described with reference to the accompanying drawings. The present embodiment relates to a web application used in, for example, school education. The web application allows teachers to prepare teaching materials, etc. for classrooms or for homework assignments and to check the homework assignments, and allows students to use the teaching materials and answer the homework assignments and submit the answers. The web application is prepared in a server, and is provided as a web service. A teacher uses the web application by accessing the server using, for example, a first terminal on which the web browser runs. The teacher can edit, through the first terminal, a teaching material as a first content which is stored in the server and to which a first address is assigned. A student uses the web application by accessing the server using, for example, a second terminal on which the web browser runs. The student can edit, through the second terminal, an answer to a homework assignment as a second content which is stored in the server and to which a second address is assigned. Here, a mathematics teaching material will be taken as an example; however, the embodiment is similarly applicable to teaching materials of other subjects of study.

[Configuration of System]

FIG. 1 is a diagram schematically showing a configuration example of a teaching material system 1 including a server 10 and a plurality of terminals, according to the embodiment. FIG. 1 shows a case where the terminals include a first terminal 20, a second terminal 30, and a third terminal 40. The number of the terminals is discretionary. The server 10 and the terminals are connected via a network 50, such as the Internet.

Each of the terminals is a device such as a personal computer (PC), a tablet information terminal, a smart phone, etc. A web browser runs on each terminal. Each terminal uses the web browser to access the server 10 via the network 50, such as the Internet, and runs a web application.

The first terminal 20, the second terminal 30, and the third terminal 40 are equivalent. As an example, a configuration of the first terminal 20 will be described. As shown in FIG. 1, the first terminal 20 includes a central processing unit (CPU) 21, a read-only memory (ROM) 22, a random-access memory (RAM) 23, a storage 24, an input device 25, a display 26, and a communication device 27, which are connected to each other via a bus line 29. The CPU 21 performs, for example, various types of signal processing. Instead of or together with the CPU, various types of integrated circuits, such as an application-specific integrated circuit (ASIC), a field-programmable gate array (FPGA), and a graphics processing unit (GPU), may be used. That is, various types of processors may be used in the first terminal 20. The ROM 22 stores, for example, a start-up program. The RAM 23 functions as a main memory of the CPU 21. As the RAM 23, a dynamic RAM (DRAM), a static RAM (SRAM), etc., may be used. As the storage 24, a hard disk drive (HDD), a solid-state drive (SSD), an embedded MultiMediaCard (eMMC), etc., may be used. The storage 24 stores various types of information, such as programs and parameters used in the CPU 21. The RAM 23 and the storage 24 are not limited thereto, and may be replaced with various types of storage devices. The input device 25 is, for example, a keyboard, a mouse, a touch panel, etc. The display 26 is, for example, a liquid crystal display, an organic EL display, etc. The communication device 27 is used for communicating with a device external to the first terminal 20. The communication device 27 establishes a connection with, for example, the Internet.

As shown in FIG. 1, the server 10 is an information processing apparatus comprising a processor 11, a ROM 12, a RAM 13, a storage 14, and a communication device 15, which are connected to each other via a bus line 19. The processor 11 performs various types of signal processing. The ROM 12 stores information used for operations of the processor 11. The RAM 13 functions as a main memory of the processor 11. Various types of storage media may be used as the storage 14. The storage 14 stores various types of information, such as programs and parameters used in the processor 11. The storage 14 also stores a database 100. The database 100 includes, for example, a material data management table 110, a material data table 120, a homework data management table 130, and a homework submission management table 140, which will be described later. The communication device 15 establishes a connection with, for example, the Internet.

[Operations of System]

A description will now be given of operations according to the present embodiment.

<Overview of Operation of Web Application Used by Teacher>

First, the operation of the processor 11 of the server 10 when a teacher operates a terminal to access a teacher's web page will be described, with reference to the flowchart shown in FIG. 2. For the sake of simplicity, the terminal operated by the teacher will be referred to as the "teacher's terminal".

Figure 3:
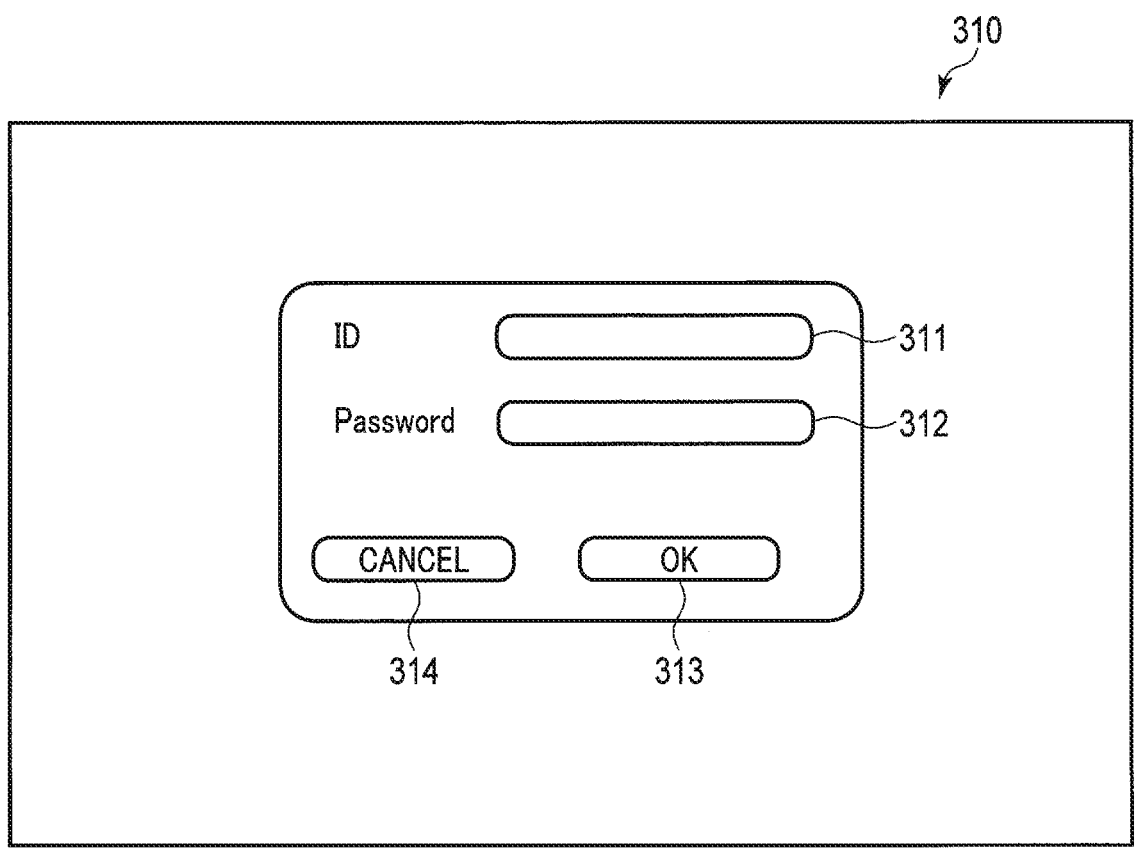
FIG. 3 is a diagram showing an example of a login screen displayed on a teacher's terminal.

In step S101, the processor 11 causes the teacher's terminal to display a login screen. Teachers who use the web service of the present embodiment are assigned with unique IDs and corresponding passwords. FIG. 3 shows an example of a login screen 310. The login screen 310 includes an ID entry field 311 to enter an ID, and a password entry field 312 to enter a password. The login screen 310 further includes an OK icon 313, which is operated to transmit the entered ID or password, and a cancel icon 314 to cancel the login. A teacher operates the teacher's terminal on which the login screen 310 is displayed, enters his or her ID and password, and selects the OK icon. At this time, the teacher's terminal transmits the ID and password to the server 10.

In step S102, the processor 11 determines whether or not the teacher's terminal is to be logged in, namely, whether or not a valid combination of ID and password has been received from the teacher's terminal. If it is determined that the teacher's terminal is not to be logged in, the processing flow returns to step S101, and waits for login. If it is determined that the teacher's terminal is to be logged in, the processing flow advances to step S103.

Figure 4:
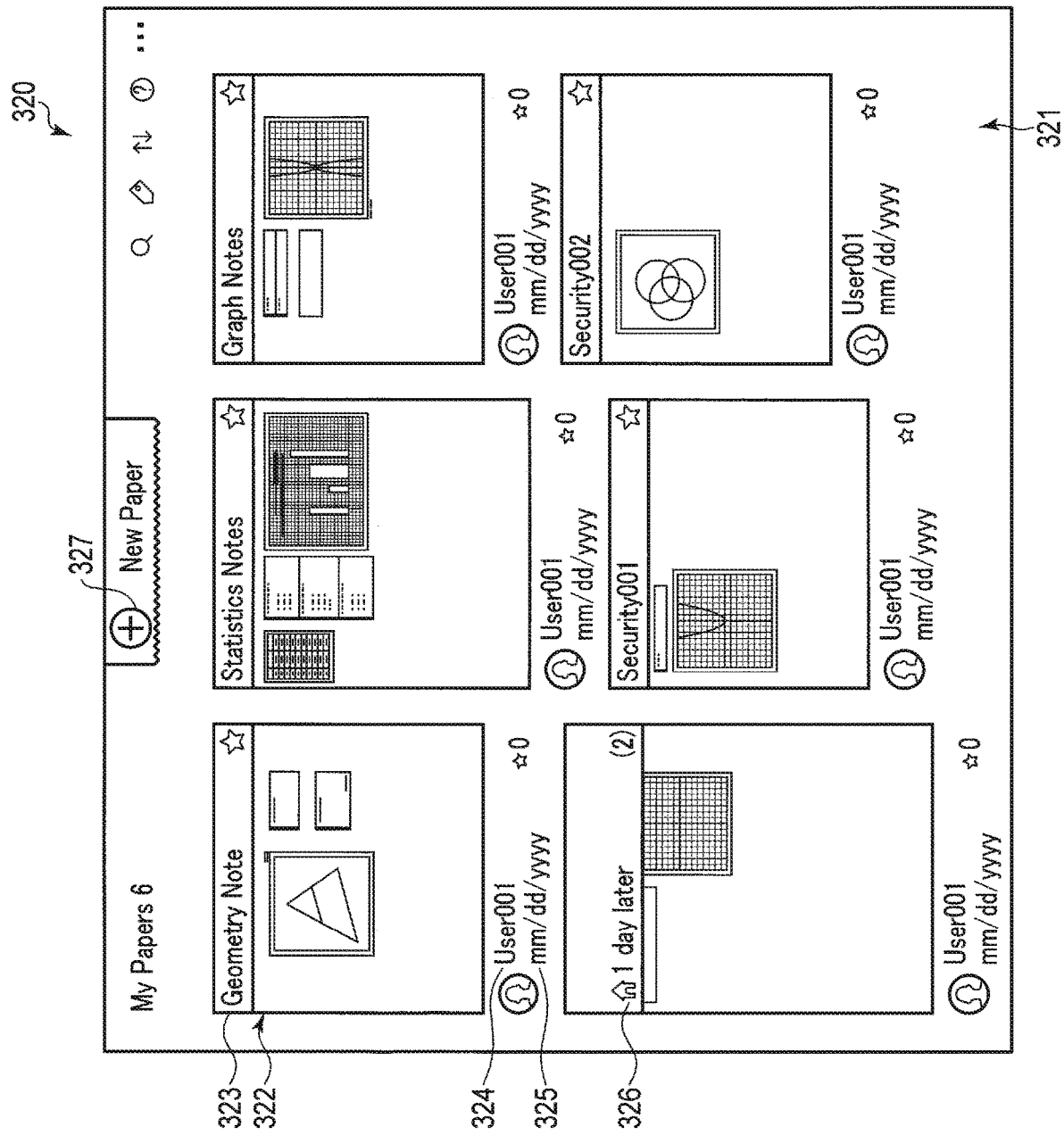
FIG. 4 is a diagram showing an example of a management screen for managing teaching materials displayed on the teacher's terminal.

In step S103, the processor 11 causes the teacher's terminal to display a management screen. FIG. 4 shows an example of the management screen 320. The management screen 320 includes a thumbnail image group 321. The thumbnail image group 321 includes a plurality of thumbnail images 322. Each of the thumbnail images 322 shows a material created by a teacher. Each thumbnail image 322 may include, for example, a material title indication 323, a creator indication 324, and an update time indication 325, etc. If the material is specified as "homework", as will be described later, the thumbnail image 322 may include an indication 326 indicating the number of days left until the deadline for the homework assignment and the number of answers that have been submitted. The management screen 320 includes a create icon 327 for creating a new material.

The teacher performs various types of operations on the management screen 320 displayed on the teacher's terminal. For example, to create a new material, the teacher selects a create icon 327. To edit a material that has already been created, the teacher selects a thumbnail image 322 of the material to be edited. The web application of the present embodiment has a function of confirming the homework submission status, etc. regarding the material assigned as homework. By selecting "SUBMISSION STATUS DETAILS" of a particular material, the teacher can confirm the submission status, etc. regarding the material. The submission status details can be selected from a menu that appears upon, for example, a right-click mouse operation while the pointer is over the thumbnail image 322 of the material.

In step S104, the processor 11 determines whether or not creation of a new material has been selected. If creation of a new material has not been selected, the processing flow advances to step S107. If creation of a new material has been selected, the processing flow advances to step S105. In step S105, the processor 11 creates new material data. In step S106, the processor 11 performs a material edit process, in which the created material is edited. Details of the material edit process will be described later. After the material edit process, the processing flow advances to step S107.

In step S107, the processor 11 determines whether or not edition of a material has been selected. If edition of a material has not been selected, the processing flow advances to step S109. If edition of a material has been selected, the processing flow advances to step S108. In step S108, the processor 11 performs a material edit process. Subsequently, the processing flow advances to step S109.

In step S109, the processor 11 determines whether or not confirmation of the homework submission status has been selected. If confirmation of the homework submission status has not been selected, the processing flow advances to step S111. If confirmation of the homework submission status has been selected, the processing flow advances to step S110. In step S110, the processor 11 performs a submission status confirmation process. Details of the submission status confirmation process will be described later. After the submission status confirmation process, the processing flow advances to step S111.

In step S111, the processor 11 determines whether or not a logout operation has been performed by the teacher. If a logout operation has not been performed, the processing flow returns to step S103. That is, while the login is in effect, the processing from step S103 to step S111 is repeated. If it is determined that a logout operation has been performed, a logout process is performed, and the processing flow returns to step S101. That is, the teacher's terminal is caused to display a login screen until login is performed again.

FIGS. 5A-5D respectively show examples of the material data management table 110, the homework data management table 130, the homework submission management table 140, and the material data table 120.

The material data management table 110 shown in FIG. 5A is a table containing, for each teaching material, information such as a data ID, a teacher ID, a material ID, a state of the material, and a URL for publication. When material data is created in step S105, for example, a new row of material data is added to the material data management table 110. The contents of the material data are separately stored in the material data table 120 shown in FIG. 5D, as will be described later.

The data ID is an ID uniquely assigned to each item of material data. The teacher ID is an ID assigned to a teacher who has created the material data. As an example, FIG. 5A shows three items of material data created by the teacher assigned with the ID "T0001". The material ID is an ID assigned to each material. The material ID may be an ID associated with the teacher ID, as in the example shown in FIG. 5A.

In the web application of the present embodiment, a material may be set to one of the three states: "unpublished", "homework", and "published". The "unpublished" is a state in which the material cannot be viewed by anyone except the teacher who has created the material, since the material is in the process of being created by the teacher, or has been completed but should not be published to students in view of the progress of the class, for example. The "homework" is a state in which the material can be viewed by students, and the students can create answers, etc. thereto, and submit the answers, etc. to the teacher. The material in the "published" state is given unique address information, such as the URL for publication. The "published" is a state in which the material can be viewed only by users who know the address. A password may be set to view a material in the "published" state.

Figure 6:
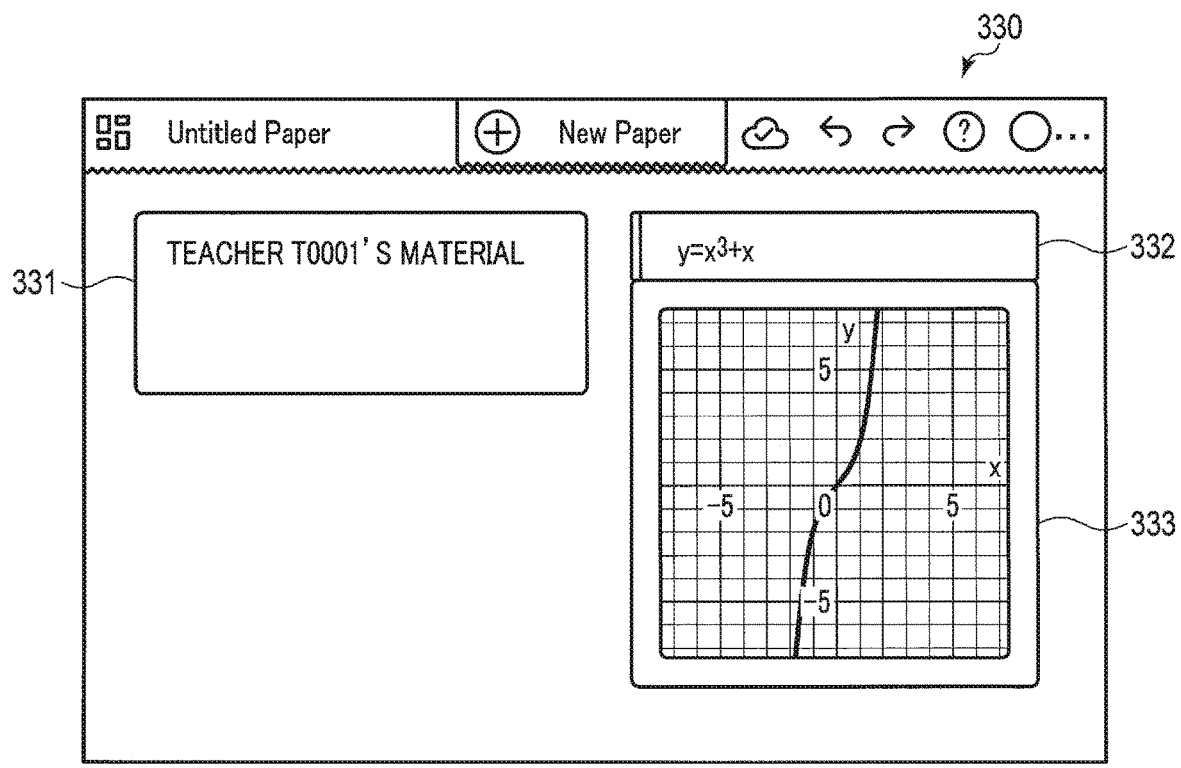
FIG. 6 is a diagram showing an example of a material screen displayed on the teacher's terminal as a teaching material.

The information forming the contents of materials is stored in the material data table 120 shown in FIG. 5D. This information is changed in the material edit process in step S106 or S108. FIG. 6 shows a material screen 330, which is a display example of the material edited in the material edit process. In the present embodiment, the materials are managed as sticky notes, and the material screen 330 includes a plurality of sticky notes. The sticky notes are categorized into, for example, memo notes, graph notes, geometry notes, and equation notes. A teacher and a student can create a desired object by creating a note corresponding to an object to be created, and then performing an operation on the created note. The memo note is a note on which a text such as a comment is shown. In the example of FIG. 6, a memo note 331 containing the text "teacher T0001's material" is included in the material. The graph note and the geometry note are notes equipped with a user interface that allows objects such as graphs and geometric shapes to be easily created. In the example of FIG. 6, the material includes a graph note 333 including a graph indication area in which the graph "$y=x^3+x$" is shown. The geometry note (not shown in the drawings) is equipped with a user interface that allows basic shapes such as a triangle, a circle, and a cone to be created through a simple operation. The equation note is a note created in association with the graph note and is equipped with a user interface that allows a graph and a geometric shape to be created based on the equation. In the example of FIG. 6, the material includes an equation note 332 including the equation "$y=x^3+x$".

These items of information on the notes are stored in the material data table 120. The material data table 120 contains, for each note, information such as a note ID, a material ID/submission ID, a data type, data contents, and a homework editability flag. The note ID is an ID uniquely assigned to each note. The material ID/submission ID is a material ID or a submission ID. The material ID corresponds to the material ID managed by the material data management table shown in FIG. 5A. The submission ID is an ID uniquely assigned to a submission created by a student for a material set as "homework".

The data type represents one of "memo" corresponding to the memo note, "equation" corresponding to the equation note, and "graph" corresponding to the graph note. The data contents represent the contents of the note.

The data corresponding to the memo note 331 is the data assigned with the note ID "S0001". The data assigned with the note ID "S0001" contains the character string "teacher T0001's material" as the data contents. Based on this character string, the material screen 330 displays the text "teacher T0001's material" on the memo note 331.

The data corresponding to the equation note 332 is the data assigned with the note ID "S0002". The data assigned with the note ID "S0002" contains the equation "$y=x^3+x$" as the data contents. Based on this equation, the material screen 330 displays the equation "$y=x^3+x$" on the equation note 332.

The data corresponding to the graph note 333 is the data assigned with the note ID "S0003". The data assigned with the note ID "S0003" contains the equation "$y=x^3+x$" as the data contents. Based on this equation, the material screen 330 displays a graph corresponding to "$y=x^3+x$" on the graph note 333.

As will be described later, a material set as "homework" may include data that should not be edited by students, such as contents of a memo note prepared by a teacher. The homework editability flag is set as "non-editable" for data that should not be edited by students. The data for which the homework editability flag is set as "non-editable" is prohibited from being altered by students, etc.

<Creation of Material by Teacher>

The material edit process will be described with reference to the flowchart shown in FIG. 7.

In step S201, the processor 11 determines whether or not a note creation operation has been performed on the teacher's terminal. The note creation operation can be performed by selecting a corresponding note creation icon from a menu that appears upon, for example, a right-click mouse operation while the pointer is in the material screen 330. If the note creation operation has not been performed, the processing flow advances to step S204. If the note creation operation has been performed, the processing flow advances to step S202.

In step S202, the processor 11 performs a note creation process. At this time, one row of data is added to the material data table 120 shown in FIG. 5D. If the memo note create icon has been selected, the data type of the data is specified as "memo". If the graph note create icon has been selected, the data type of the data is specified as "graph". If the geometry note create icon has been selected, the data type of the data is specified as "geometry". If the equation note create icon has been selected, the data type of the data is specified as "equation".

In step S203, the processor 11 performs an edit process of the created note. The processor 11 sets a text, a graph, a shape, and an equation respectively entered into a memo note, a graph note, a geometry note, and an equation note on the teacher's terminal as the data contents of the note.

The equation note edit process may include creation of a graph note. If graph note creation has been selected from a menu that appears upon, for example, a right-click mouse operation while the pointer is over the equation note 332, a graph note is created. On this graph note, a graph corresponding to the data on the equation note is plotted. Subsequently, the processing flow advances to step S204.

In step S204, the processor 11 determines whether or not a note edit operation has been performed on the teacher's terminal. The note edit operation can be performed by selecting one of the memo note, the graph note, the geometry note, and the equation note, e.g., an equation note 332 by, for example, a double-click mouse operation on the material screen 330. If the note edit operation has not been performed, the processing flow advances to step S206. If the note edit operation has been performed, the processing flow advances to step S205.

In step S205, the processor 11 performs an edit process of the selected note. The processor 11 sets a text, a graph, a shape, and an equation respectively entered into a memo note, a graph note, a geometry note, and an equation note on the teacher's terminal as the data contents of the note. Subsequently, the processing flow advances to step S206.

In step S206, the processor 11 determines whether or not a state change operation has been performed on the teacher's terminal. The state change operation can be performed by selecting "CHANGE STATE" from a menu that appears upon, for example, a right-click mouse operation while the pointer is in the material screen 330. If the state change operation has not been performed, the processing flow advances to step S208. If the state change operation has been performed, the processing flow advances to step S207.

In step S207, the processor 11 performs a state change process. For example, the processor 11 shows three states, i.e., "unpublished", "homework", and "published" on the teacher's terminal, and determines the state after the change in accordance with an entry on the teacher's terminal. In accordance with the determined state, the processor 11 changes the state information contained in the material data management table 110. If the state is set as "published", the processor 11 assigns a URL for publication, and stores it as "publication URL" information in the material data management table.

If the state is set as "homework", the processor 11 adds a row of data to the homework data management table 130 shown in FIG. 5B. As shown in FIG. 5B, the homework data management table 130 contains, for each item of homework data, information such as a homework ID, a material ID, a deadline, a URL, and a password. The homework ID is an ID uniquely assigned to each material set as "homework". The material ID corresponds to the material ID contained in the material data management table 110. By this material ID, the material contained in the material data management table 110 and the material contained in the homework data management table 130 are associated with each other. The deadline is information on the deadline for submission of the homework assignment. If "homework" is selected in the state change process, the processor 11 causes the material screen 330 to display a deadline entry screen, prompting an entry of the deadline on the teacher's terminal. If a deadline is entered on the teacher's terminal, the processor 11 sets the deadline as deadline information in the homework data management table 130. If "homework" is selected in the state change process, the processor 11 assigns, to the homework data, a URL, which is a unique address given to the homework assignment, and a password, and stores the deadline in the homework data management table 130. In this manner, according to the web application of the present embodiment, it is possible to manage the deadline for submission of the homework.

The setting may be configured to prohibit students from creating an answer to a homework assignment for which the deadline has passed. Moreover, the setting may be configured to prohibit students from viewing a homework assignment for which the deadline has passed. Furthermore, the setting may be configured to prohibit teachers from editing a homework assignment for which the deadline has passed.

After the state change process, the processing flow advances to step S208. In step S208, the processor 11 determines whether or not an address display operation has been performed on the teacher's terminal. The address display operation can be performed by selecting "DISPLAY ADDRESS" from a menu that appears upon, for example, a right-click mouse operation while the pointer is in the material screen 330. If the address display operation has not been performed, the processing flow advances to step S210. If the address display operation has been performed, the processing flow advances to step S209. In step S209, the processor 11 causes the teacher's terminal to display an address. Here, the address to be displayed is the URL stored as "publication URL" in the material data management table 110 when the material is in the "published" state. If the material is in the "homework" state, the address is the URL stored in the "URL" of the homework data management table 130. If the material is in the "unpublished" state, the address is not displayed. After the address display process, the processing flow advances to step S210.

In step S210, the processor 11 determines whether or not end of the material edit process has been entered on the teacher's terminal. If end of the material edit process has not been entered, the processing flow returns to step S201. At this time, the processing from step S201 to step S210 is repeated. If end of the material edit process has been entered, the material edit process is ended, and the processing flow returns to the process described with reference to FIG. 2.

Figure 8:
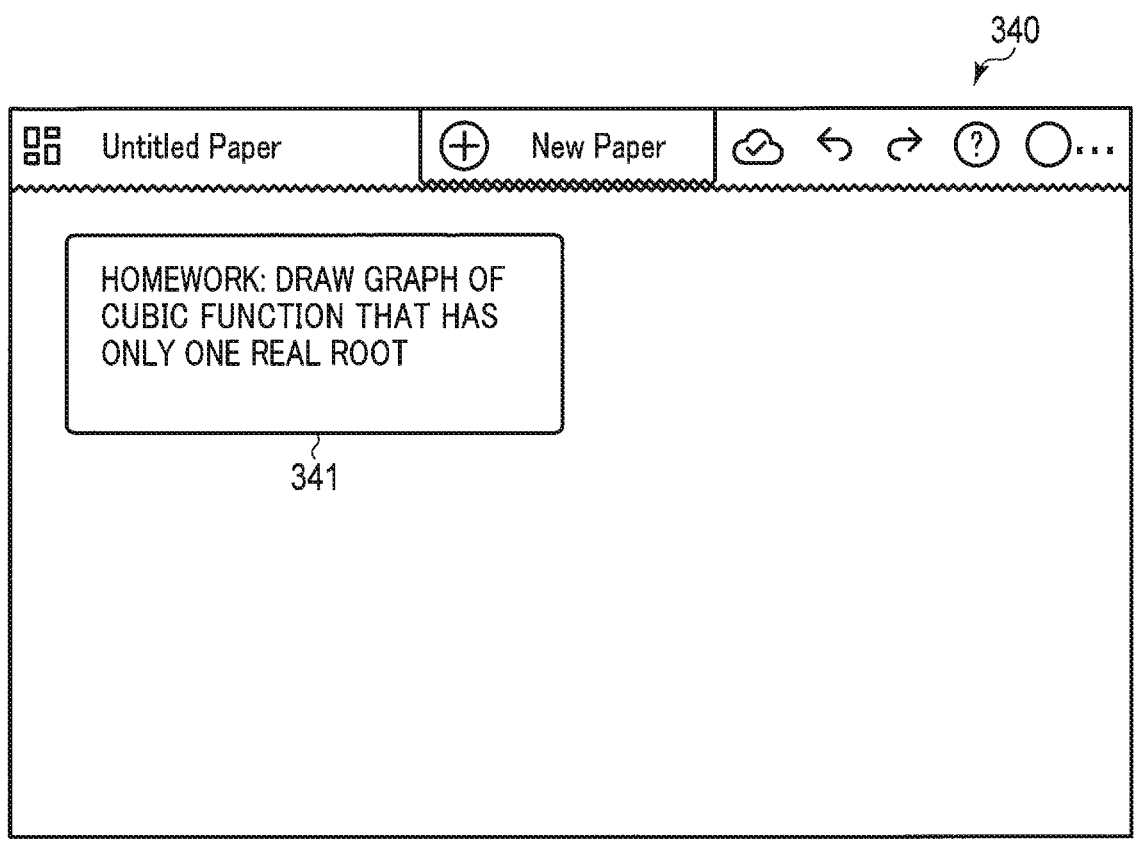
FIG. 8 is a diagram showing an example of a homework screen displayed on the teacher's terminal as a homework assignment.

As an example, a case will be described where a homework assignment as in the homework screen 340 shown in FIG. 8 is created. Let us assume that the material ID of the homework assignment is "T0001-2". On the teacher's terminal, creation of a memo note, which appears upon a right-click operation on the homework screen 340, is selected. At this time, the processor 11 creates data on the memo note in step S202, and allows the memo note 341 to be displayed on the homework screen 340. In step S203, the contents corresponding to the operation on the teacher's terminal are set as the data contents of the memo note 341. Thereby, data is created for which the note ID is "S0004", the material ID is "T0001-2", the data type is "memo", and the data contents are "Homework: Draw a graph of a cubic function that has only one real root", as shown in the material data table 120 shown in FIG. 5D. If "non-editable" is selected from a menu that appears upon a right-click operation over the memo note 341, the processor 11 sets the homework editability flag of the data assigned with the note ID "S0004" as "non-editable". If this material is set as "homework" in step S207, the data on the material is added to the homework data management table 130 shown in FIG. 5B, and the deadline, the URL, and the password are set.

The teacher informs the students of the URL and the password of the homework assignment in a classroom. The students bring home the information on the URL and the password, and access the URL informed by the teacher on the student's terminal.

<Creation of Answer by Student>

Figure 9A:
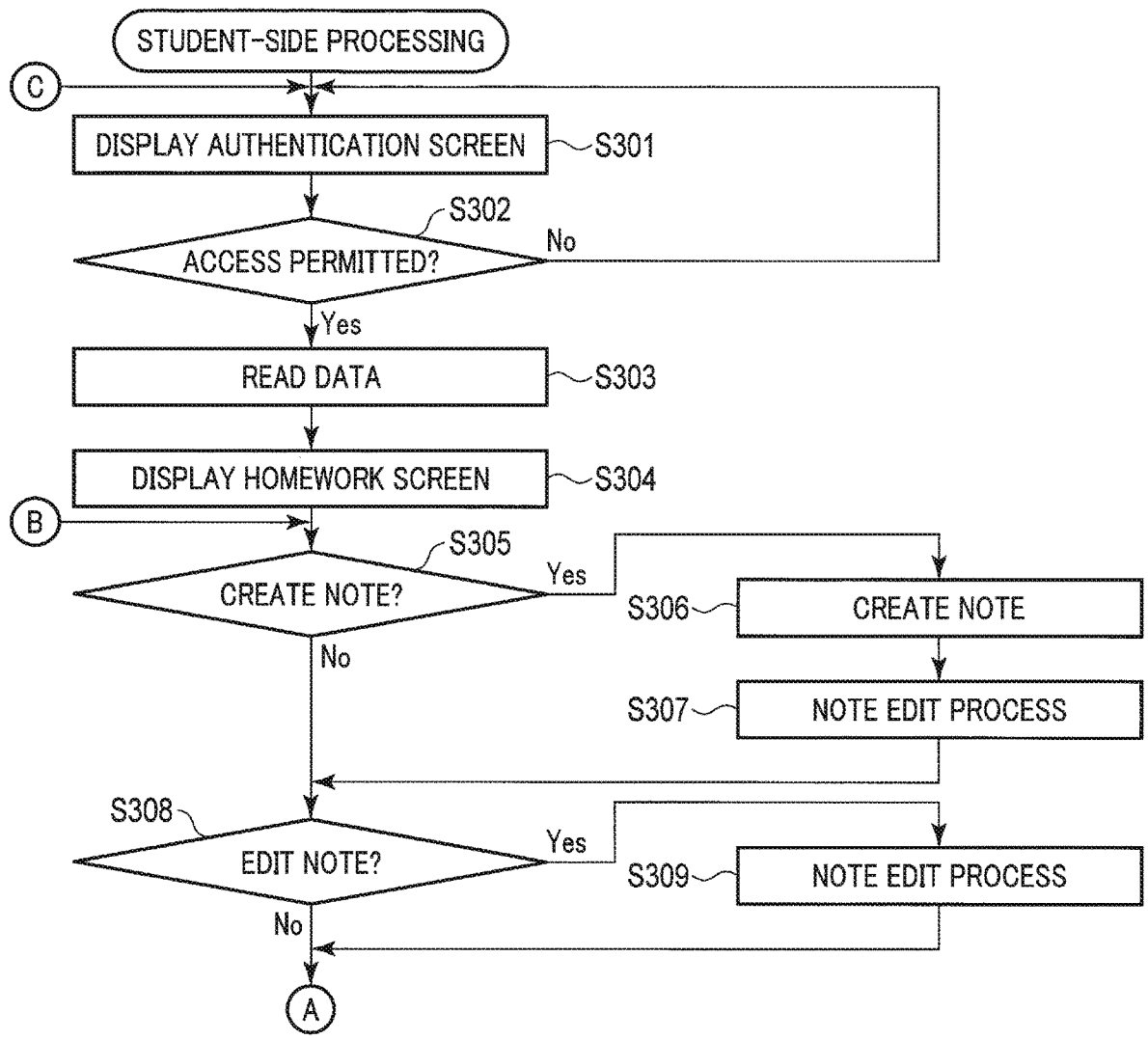
FIG. 9A is a flowchart showing an example of student-side processing of the web application.
Figure 9B:
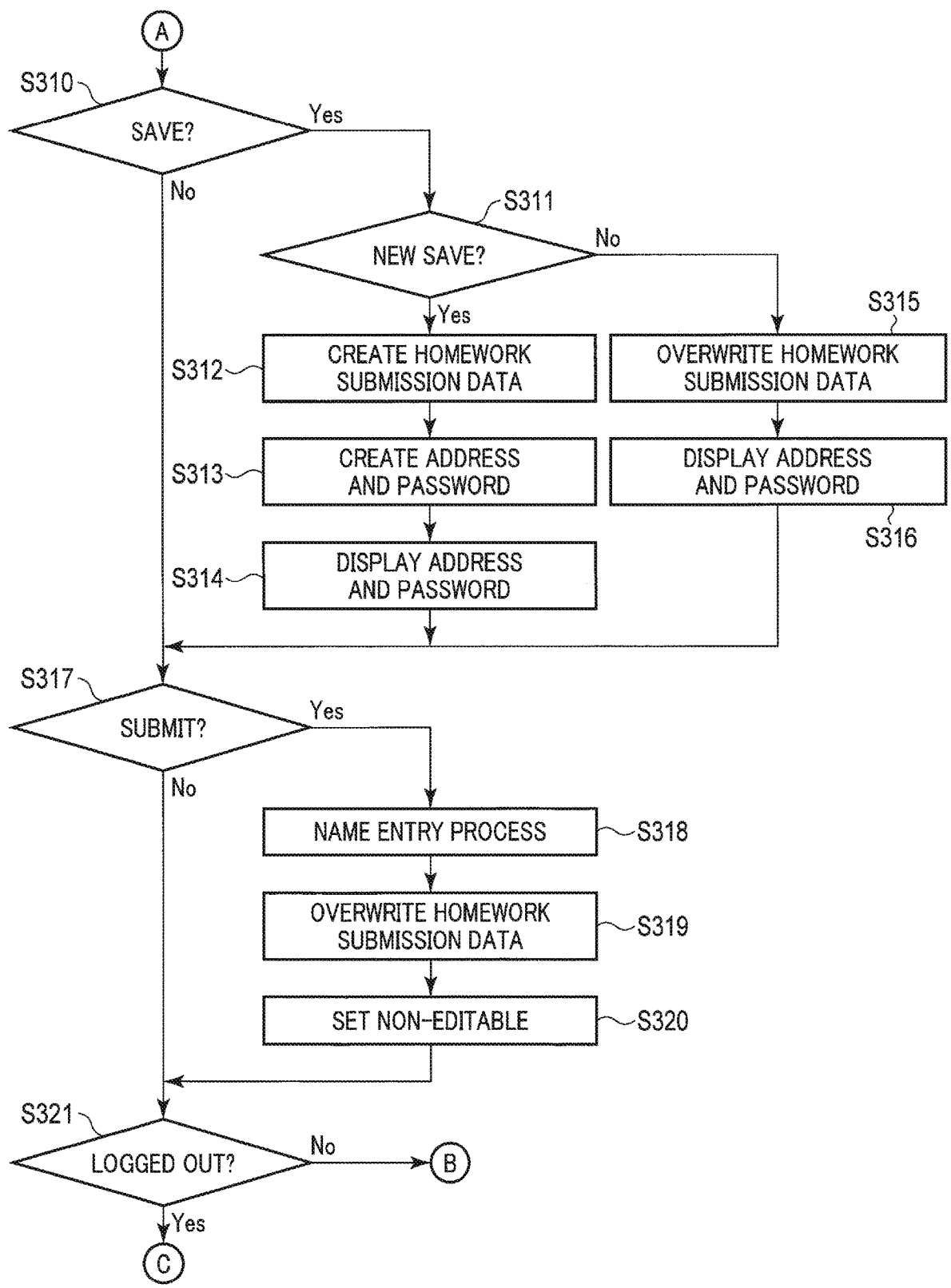
FIG. 9B is a flowchart showing an example of student-side processing of the web application.

The operation of the processor 11 of the server 10 will be described with reference to the flowcharts shown in FIGS. 9A and 9B, when a student has operated the terminal to access the homework data (URL of the homework assignment) in the server 10. For the sake of simplicity, the terminal operated by the student will be referred to as "student's terminal".

Figure 10:
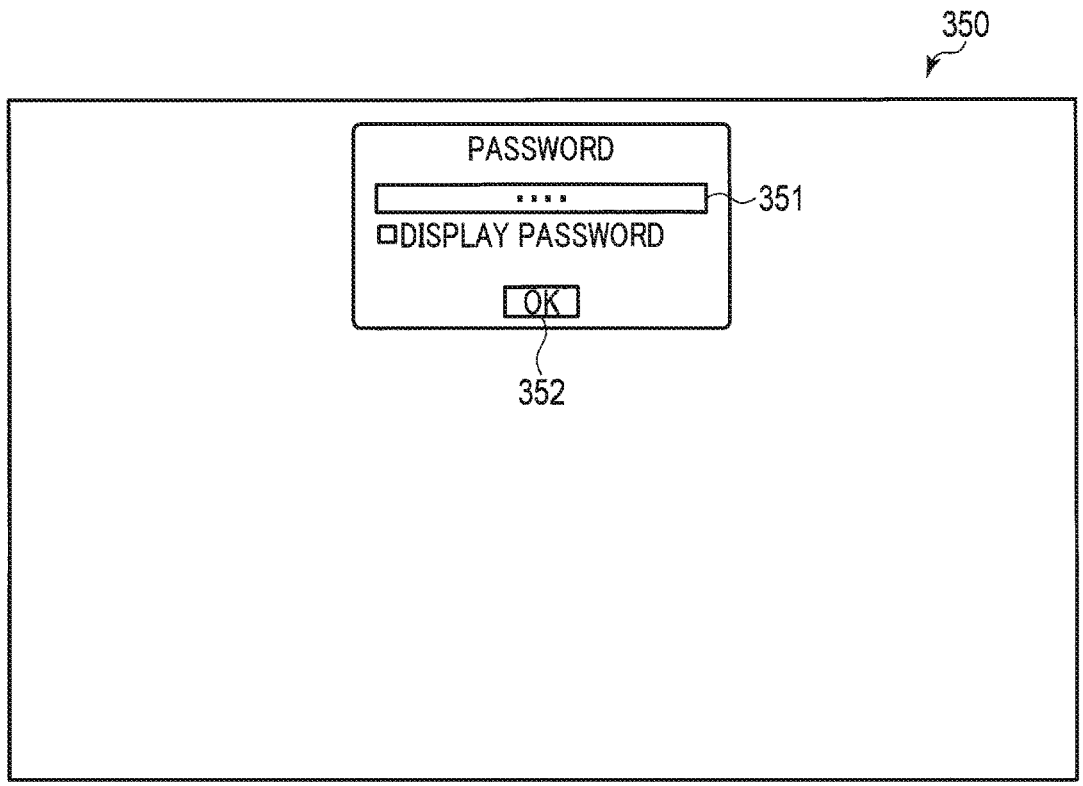
FIG. 10 shows an example of an authentication screen displayed on a student's terminal.

In step S301, the processor 11 causes the student's terminal to display an authentication screen. FIG. 10 shows an example of an authentication screen 350 displayed on the student's terminal. The authentication screen 350 includes a password entry field 351 and an OK icon 352. A student operates the student's terminal, enters a password informed by the teacher in the password entry field 351, and selects the OK icon 352. At this time, the student's terminal transmits the password to the server 10.

In step S302, the processor 11 determines whether or not to permit access from the student's terminal to the homework data in the server 10. That is, the processor 11 determines whether or not the correct password associated with the URL has been received from the student's terminal. If the correct password has not been received, the processing flow returns to step S301 and stands by. If the correct password has been received, the processing flow advances to step S303.

In step S303, the processor 11 reads, from the material data table 120, the data associated with the material ID of the homework assignment. In step S304, the processor 11 creates a homework screen based on the read data, and causes the student's terminal to display the homework screen.

Figure 11:
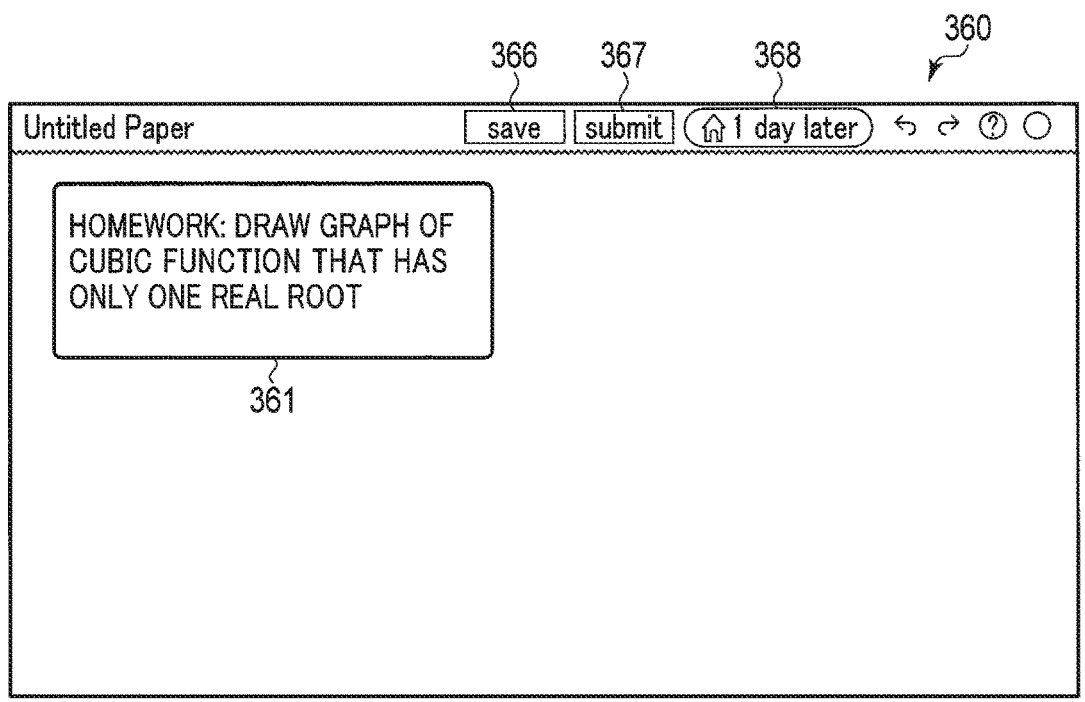
FIG. 11 is a diagram showing an example of a homework screen displayed on the student's terminal as a homework assignment.

FIG. 11 shows an example of the homework screen 360. The homework screen 360 includes a memo note 361. The memo note 361 is a note related to the homework assignment created by the teacher, and is created based on the material data table 120. Accordingly, it corresponds to the material created by the teacher shown in FIG. 8. The homework screen 360 includes a save icon 366, a submit icon 367, and a deadline indication 368. The save icon 366 is an icon that is selected by a student to temporarily save the data while creating an answer to a homework assignment. The submit icon 367 is an icon selected by a student to submit data to the teacher after completing an answer to the homework assignment. The deadline indication 368 is an indication showing the deadline for submission of the homework assignment when the state of the material data is set as "homework" by the teacher.

In step S305, the processor 11 determines whether or not a note creation operation has been performed on the student's terminal. The note creation operation can be performed by selecting a corresponding note creation icon from a menu that appears upon, for example, a right-click mouse operation while the pointer is in the homework screen 360. If the note creation operation has not been performed, the processing flow advances to step S308. If the note creation operation has been performed, the processing flow advances to step S306.

In step S306, the processor 11 performs a note creation process. In step S307, the processor 11 performs an edit process of the created note. The processor 11 sets a text, a graph, a shape, and an equation respectively entered into a memo note, a graph note, a geometry note, and an equation note on the student's terminal as the data contents of the note. Subsequently, the processing flow advances to step S308.

The equation note edit process may include creation of a graph note. If creation of a graph note is selected from a menu that appears upon, for example, a right-click mouse operation while the pointer is over the equation note 362, a graph note 363 is created. On this graph note 363, a graph corresponding to the data on the equation note 362 is plotted. Subsequently, the processing flow advances to step S308.

In step S308, the processor 11 determines whether or not a note edit operation has been performed on the student's terminal. The note edit operation can be performed by selecting one of the memo note, the graph note, the geometry note, and the equation note by, for example, a double-click mouse operation on the homework screen 360. If the note edit operation has not been performed, the processing flow advances to step S310. If a memo note edit operation has been performed, the processing flow advances to step S309.

In step S309, the processor 11 performs an edit process of the selected note. The processor 11 sets a text, a graph, a shape, and an equation respectively entered into a memo note, a graph note, a geometry note, and an equation note on the student's terminal as the data contents of the note. Subsequently, the processing flow advances to step S310.

Figure 12:
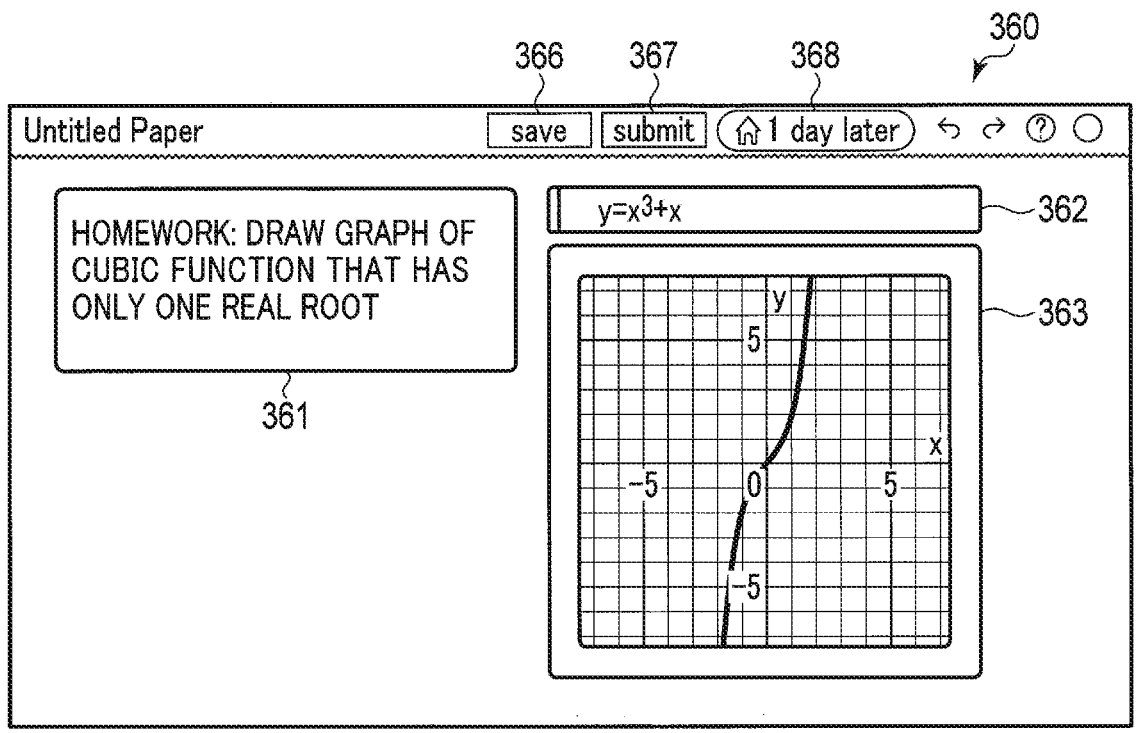
FIG. 12 is a diagram showing an example of a homework screen displayed on the student's terminal as an answer to the homework assignment.

In the example shown in FIG. 12, the students are not permitted to edit the memo note 361 created by the teacher, since the homework editability flag is set as "non-editable" by the teacher. The equation note edit process includes a graph note creation process. Subsequently, the processing flow advances to step S310.

In step S310, the processor 11 determines whether or not the save icon 366 has been selected on the student's terminal. If the save icon 366 has not been selected, the processing flow advances to step S317. If the save icon 366 has been selected, the processing flow advances to step S311.

In step S311, the processor 11 determines whether or not the answer to the homework assignment being edited by the student is new and saved for the first time. If the save operation is performed for the first time, the processing flow advances to step S312.

In step S312, the processor 11 creates new homework submission data. The homework submission data is managed by the homework submission management table 140 shown in FIG. 5C. If the homework submission data is created in step S312, a new row of homework submission data is added to the homework submission management table 140 shown in FIG. 5C. At this time, new data indicating the contents of a note corresponding to the homework submission data and indicating the contents of the answer to the homework assignment is added to the material data table 120 shown in FIG. 5D.

The homework submission management table 140 manages, for each answer to the homework assignment created by the students, items such as a submission ID, a homework ID, a status, a URL, a name, and a homework management password. The submission ID is an ID uniquely assigned to an answer created by a student. The homework ID is an ID assigned to indicate which of the homework assignments the answer is made to, and corresponds to the homework ID managed by the homework data management table 130 shown in FIG. 5B. The status indicates either "saved" or "submitted" status. The "saved" status indicates that the student is in the process of creating the answer and has not submitted the answer. The "submitted" status indicates that the student has completed creating the answer and has submitted the answer. The URL is a unique address assigned to each submission ID. The "name" is information on the student's name registered at the time of submission of the homework assignment, and is entered by the student himself or herself. The homework management password is a password requested when the data is accessed using the "URL", and is a password individually assigned to each submission ID.

The information forming the contents of the answers to the homework assignments is stored in the material data table 120 shown in FIG. 5D. As shown by the data assigned with the note IDs "S0005", "S0006", "S0007" and "S0008" in the material data table 120 shown in FIG. 5D, the data on the answers to the homework assignments created by students is managed in association with the submission IDs of the homework submission data. The data format is the same as that of the material created by the teacher. The homework editability flag set by the teacher is continuously set for the answers to the homework assignments created by students.

In step S313, the processor 11 assigns an address, such as a URL, and a password to the homework submission data created in step S312. The address is unique to each pair of the submission ID and the homework ID, and is automatically created and assigned. These items of data are stored in the homework submission management table 140. In step S314, the processor 11 causes the student's terminal to display the assigned URL and password. Subsequently, the processing advances to step S317.

The student memorizes the URL and the password displayed on the student's terminal in a desired manner, e.g., by making a note of it. Through the web application of the present embodiment, a student can access the data edited by the himself or herself any time by accessing the URL. That is, when the student's terminal has accessed the URL, the authentication screen as shown in FIG. 10 is displayed in step S301. When the student's terminal has transmitted the password corresponding to the URL to the server 10, access to the homework data in the server 10 is permitted. The data corresponding to the submission ID managed by the homework submission management table 140 is read from the material data table 120 in step S303, and is displayed on the student's terminal in step S304. Through the steps S305 to S309, the student can edit an answer to the homework assignment. The edited data can be saved in a process that will be described below. The URL and the password are displayed when a save operation is performed. Accordingly, the URL and the password will not be known to other people, thus preventing unauthorized access to the answer data from a third party.

If it is determined in step S311 that the save operation is performed not for the first time, the processing flow advances to step S315. The save operation being performed not for the first time means that data is already present in the homework submission management table 140. In step S315, the processor 11 overwrites the homework submission data stored in the homework submission management table 140 by updating necessary information. Also, the processor 11 updates the data associated with the homework submission data stored in the material data table 120, and adds new data associated with the homework submission data to the material data table 120. In step S316, the processor 11 causes the student's terminal to display the URL and password. Here, the URL and the password to be displayed are the same as the URL and the password displayed when the student has made a save operation in the past. Subsequently, the processing advances to step S317.

In step S317, the processor 11 determines whether or not the submit icon 367 has been selected on the student's terminal. If the submit icon 367 has not been selected, the processing flow advances to step S321. If the submit icon 367 has been selected, the processing flow advances to step S318.

Figure 13:
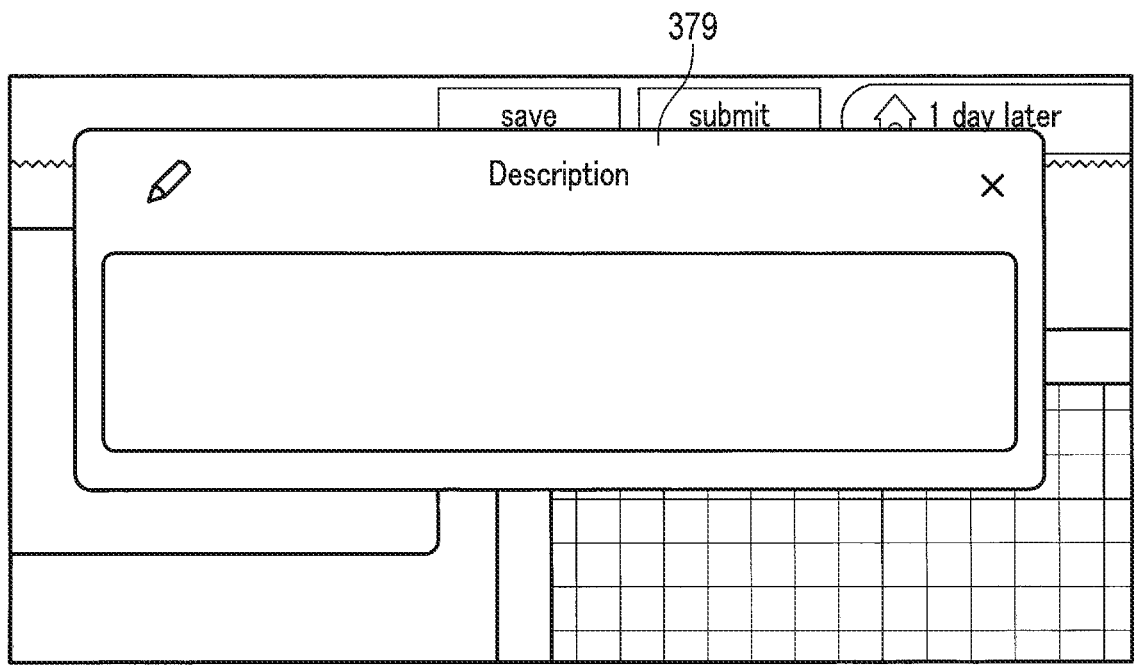
FIG. 13 is a diagram showing an example of a name entry field displayed on the student's terminal.

In step S318, the processor 11 performs a name entry process. The processor 11 causes the student's terminal to display a name entry field. FIG. 13 is an enlarged view of a part of a screen example of the student's terminal, on which a name entry field 379 is displayed as an example. A student enters his or her name into the name entry field 379. The student's terminal transmits the entered name data to the server 10.

In step S319, the processor 11 stores the name obtained from the student's terminal in association with the submission ID. That is, the processor 11 causes the homework submission management table 140 to store the name in the name field, and overwrites the data. In step S320, the processor 11 changes the status of the data that has been submitted to "submitted". Thereby, the data is set as "non-editable". By thus making the submitted data non-editable, it is possible to prevent unauthorized alteration by a third party after the student has submitted an answer to the homework assignment. By thus selecting the submit icon 367, the data is set to a state indicating completion of editing. Subsequently, the processing flow advances to step S321.

In step S321, the processor 11 determines whether or not a logout process has been performed on the student's terminal. If a logout process has not been performed, the processing flow returns to step S305. That is, editing of the answer to the homework assignment is continued. If a logout process has been performed, the processing flow returns to step S301. That is, the processing flow stands by until access is made to the authentication screen.

<Check of Answer by Teacher>

Figure 14:
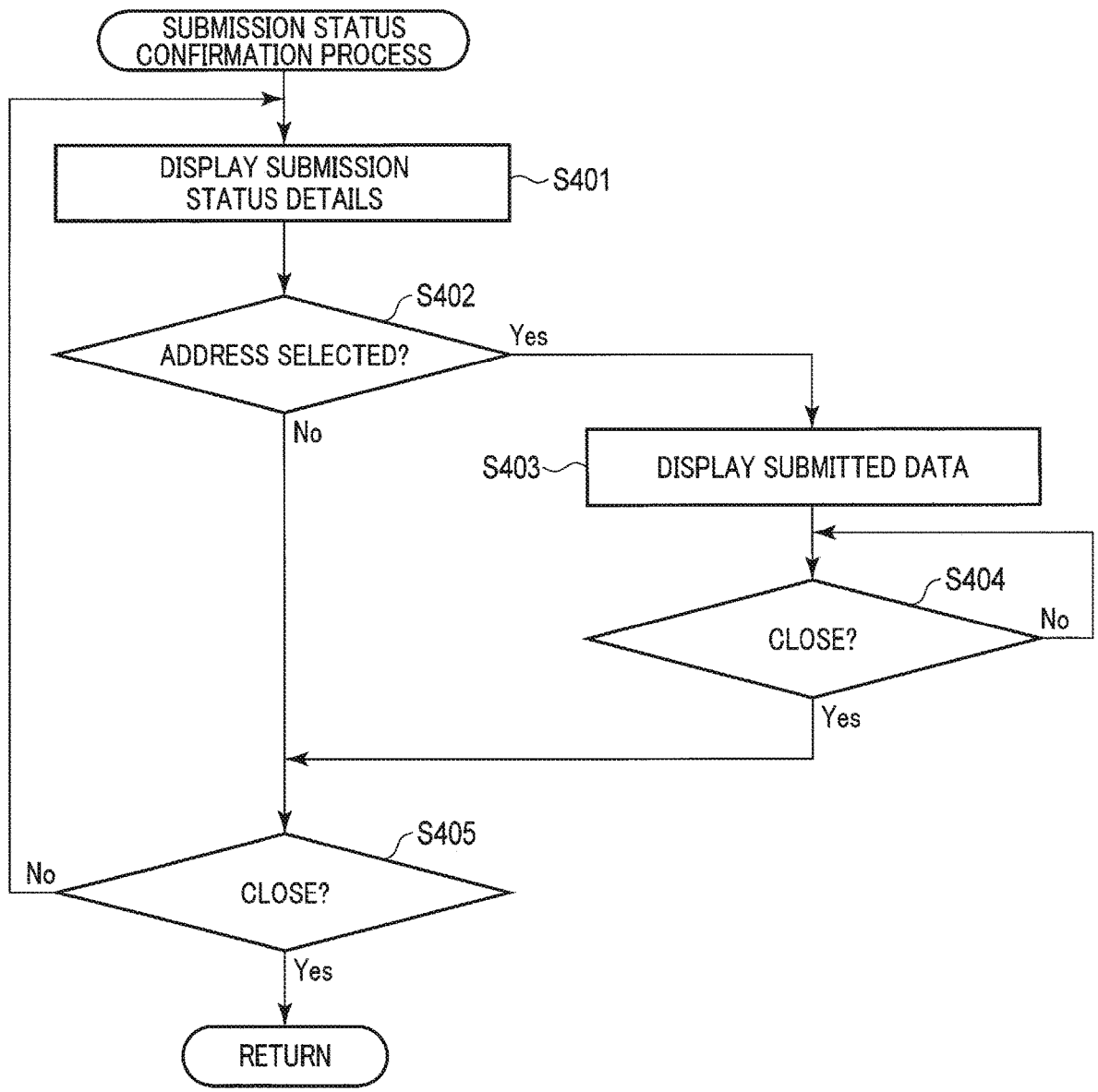
FIG. 14 is a flowchart showing an example of a submission status confirmation process on the teacher side.

A process of checking, by a teacher, an answer to a homework assignment submitted by a student will be described. This process is performed in the submission status confirmation process performed in step S110. The submission status confirmation process is performed by selecting "SUBMISSION STATE DETAILS" from a menu that appears upon a right-click mouse operation while the pointer is over the thumbnail image of the material set by the teacher as a homework assignment, on the management screen 320 shown as an example in FIG. 4. FIG. 14 shows an example of a submission status confirmation process.

In step S401, the processor 11 causes the teacher's terminal to display details of the submission status. FIG. 15 shows an example of a submission status detail screen 380 displayed on the teacher's terminal. The submission status detail screen 380 includes a homework URL indication 381, a submission status indication 382, a submission status list 383, and a close icon 386.

The homework URL indication 381 indicates a URL of the selected homework assignment. The submission status indication 382 indicates the number of students who have submitted answers to the homework assignment. The submission status list 383 indicates a list of answers submitted by students. The submission status list 383 includes a submitter name list 384 indicating the names of students who have submitted answers to the homework assignment, and a URL field 385. That is, the submission status list 383 shows a list of students' names who have submitted answers to the homework assignment and URLs of the respective answers. The close icon 386 is the icon selected by the teacher to close the submission status detail screen 380.

By referring to the homework data management table 130, the processor 11 displays, as a homework URL indication 381, a URL corresponding to a homework ID that identifies a homework assignment of which submission state details are being displayed on the submission status detail screen 380. Also, by referring to the homework submission management table 140, the processor 11 displays, on the submission status detail screen 380, the number of items of "submitted" data for a homework ID that identifies a homework assignment of which submission state details are being displayed, as a submission status indication 382, and displays, on the submission status detail screen 380, a "submitter name" and a "URL" of each item of "submitted" data for the homework ID, as a submitter name field 384 and a URL field 385 of a submission status list 383.

In step S402, the processor 11 determines whether or not one of the URLs shown in the URL field 385 has been selected on the teacher's terminal. If it is determined that no URL has been selected, the processing flow advances to step S405. If a URL has been selected, the processing flow advances to step S403.

In step S403, the processor 11 causes the teacher's terminal to display a submitted answer to the homework assignment. For example, an answer created by a student, including the memo note 361, the equation note 362, the graph note 363, etc., as shown in FIG. 12, is displayed on the teacher's terminal. In step S404, the processor 11 determines whether or not an operation to close the answer displayed on the teacher's terminal has been performed on the teacher's terminal. The processing flow stands by, until a close operation is performed. If a close operation has been performed, the processor 11 causes the teacher's terminal to stop displaying the answer to the homework assignment displayed thereon, and the processing flow advances to step S405.

In step S405, the processor 11 determines whether or not the close icon 386 on the submission status detail screen 380 has been selected. If it is determined that the close icon 386 has not been selected, the processing flow returns to step S401, and repeats the above-described steps. If the close icon 386 has been selected, the submission status confirmation process is ended.

The change of contents of the database 100 when an answer to a homework assignment is created will be described with reference to FIGS. 16A and 16B. The contents of the database 100 when a homework assignment is created by a teacher assigned with the teacher ID "T0001" are shown in FIG. 16A. The material data management table 110 contains one item of homework data crated by the teacher "T0001". The homework assignment is assigned with the material ID "T0001-1", and is set as "homework" state. The contents of the homework assignment are stored in the material data table 120 in association with the material ID. That is, the text forming the contents of the homework assignment is stored, with the data type set as "memo". Since it is not preferable that this data is altered by students, the homework editability flag is set as "non-editable".

The management information of the homework assignment is stored in the homework data management table 130 in association with the material ID. That is, the information on the submission deadline, the URL, and the password of the homework assignment is stored in the homework data management table 130. The information on the submission deadline, the URL, and the password are informed by a teacher to students verbally in classrooms, or on a message board, by electronic mail, or through other learning-support applications.

If the students have not created answers to the homework assignment, the homework submission management table 140 remains empty.

The contents of the database 100 when a student has created an answer to a homework assignment are shown in FIG. 16B. When a student has created an answer to a homework assignment, and selected the save icon for the first time, answer data associated with the homework ID is created in the homework submission management table 140. When the answer is in the "saved" status, each data is assigned with a submission ID, a unique URL, and a homework password. The homework submission management table 140 contains these items of information.

The contents of the answer are stored in the material data table 120 in association with the submission ID. For example, the contents of the "saved" answer assigned with the submission ID "S-83202" are stored as data assigned with the note IDs "S0004" and "S0005". The data "S0004" is data created by the teacher and is set non-editable. The data "S0005" is data created by a student and is set editable.

With respect to the data on the "submitted" answer assigned with the submission ID "S-83201", information on the name of the submitter is added to the homework submission management table 140. The contents of the answer assigned with the submission ID "S-83201" are stored as data assigned with the note IDs "S0002" and "S0003". The data "S0002" is data created by a teacher and is set non-editable. The data "S0003" is data created by a student; however, it has been submitted and is therefore set non-editable.

By these items of data, the above-described operations of the teacher's terminal and the student's terminal can be implemented.

<Creation of Material by Teacher Without Using Account (1)>

Figure 17:
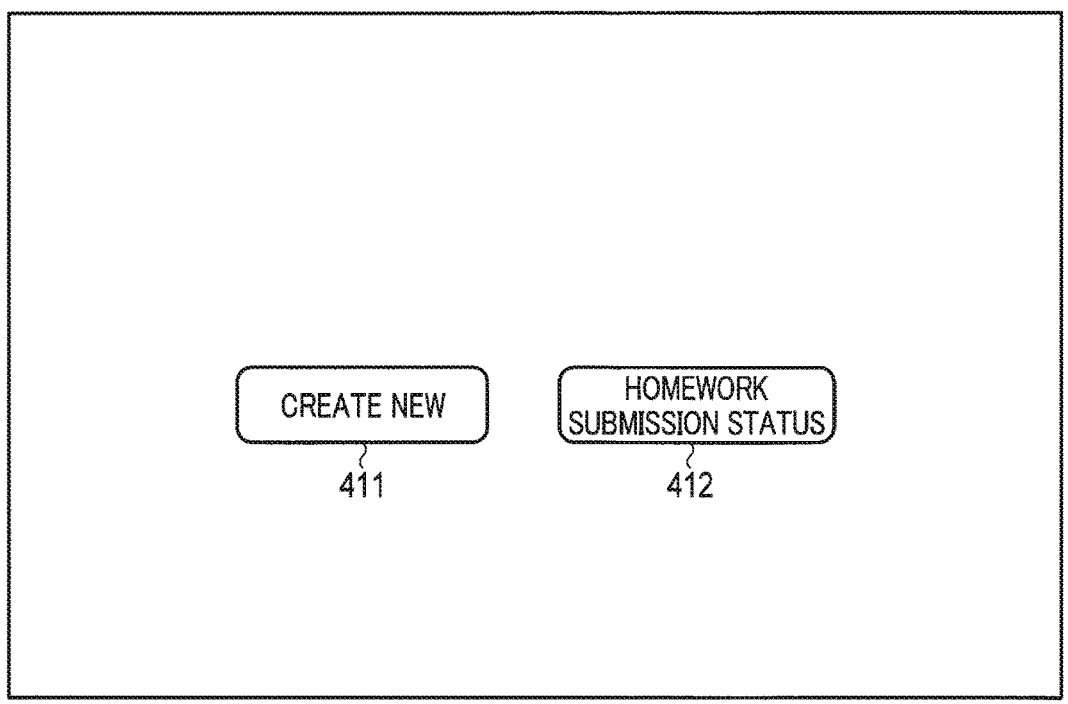
FIG. 17 is a diagram showing an example of a login screen displayed on the teacher's terminal for allowing a teacher without an account to log in as a guest.
Figure 18:
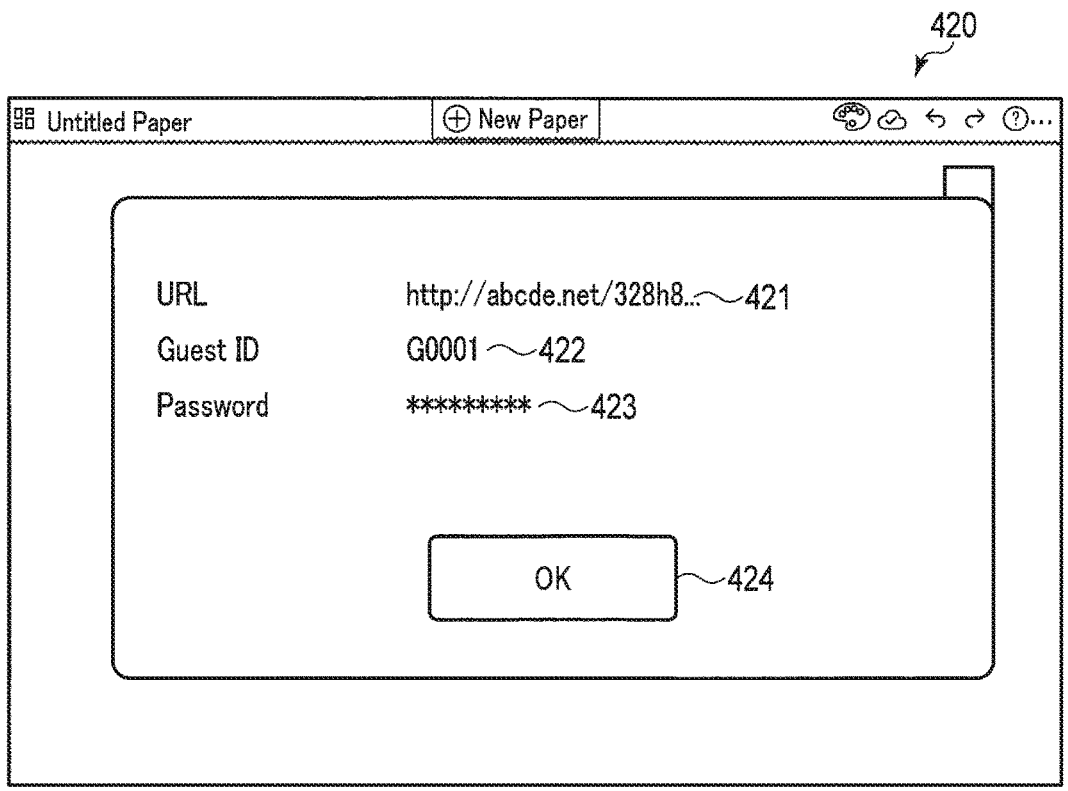
FIG. 18 is a diagram showing an example of a screen on which a guest ID, etc. is displayed.

The web application of the present embodiment may be configured in such a manner that a teacher can create a material without having an account. In this case, when access is made to a predetermined URL, a menu screen 410 as shown in FIG. 17 is displayed on the teacher's terminal. When create new 411 is selected, the processor 11 of the server 10 creates material data, and assigns, in association with the created material data, a guest ID, as well as a URL and a password unique to the created material. These items of information are shown to the guest teacher on, for example, the information presentation screen 420 shown in FIG. 18. The information presentation screen 420 includes an indication 421 of the URL assigned to the material, an indication 422 of the guest ID, an indication 423 of the password, and an OK icon 424 to close the information presentation screen 420. To edit a material, the guest teacher accesses the material data using the combination of URL and password shown thereon.

The data created at this time is shown in FIG. 19. This is the same as the above-described case except that the guest ID is assigned as the teacher ID.

Figure 20:
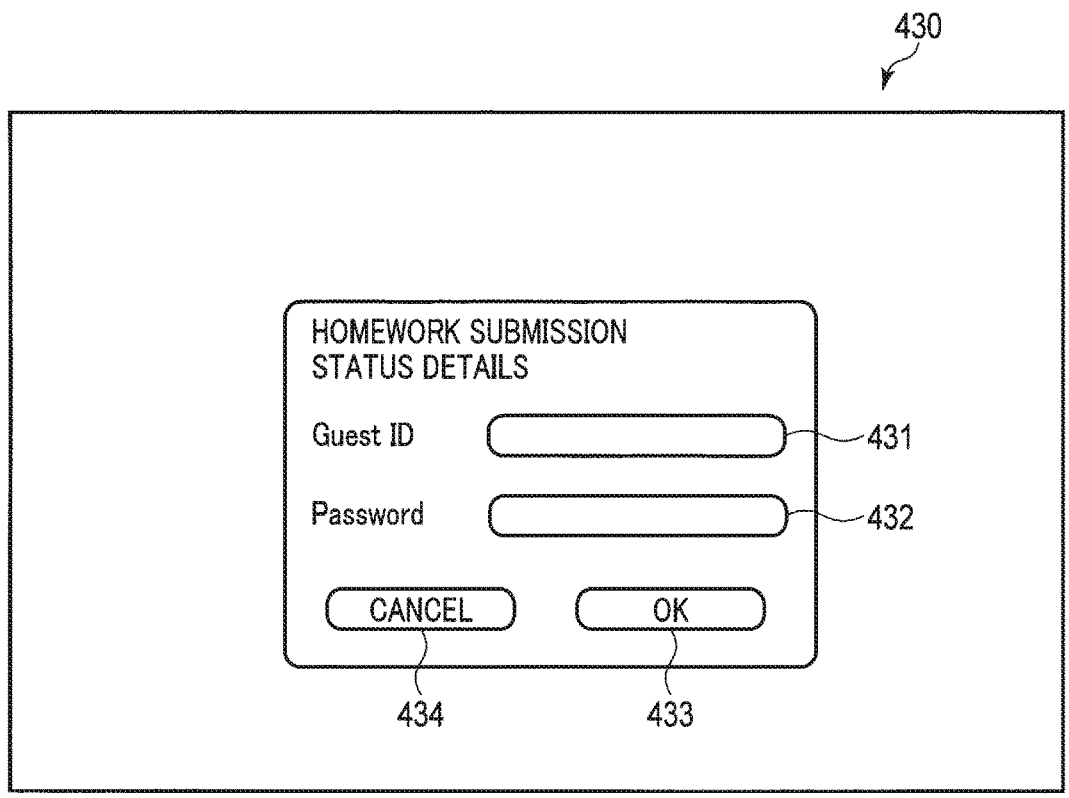
FIG. 20 is a diagram showing an example of a login screen displayed on the teacher's terminal for confirming a homework submission status with the guest ID.

A website for allowing the guest teacher assigned with the guest ID to confirm the homework submission status is also prepared. When the homework submission status 412 is selected on the menu screen 410 shown in FIG. 17, a login screen 430 as shown in FIG. 20 is displayed on the teacher's terminal. The guest teacher can log in from the login screen 430. The login screen 430 includes a guest ID entry field 431, a password entry field 432, an OK icon 433, and a cancel icon 434. Using this screen, the server 10 requests a guest ID and a password to the guest teacher. If a login is made using the guest ID from this screen, the status of the homework data associated with the guest ID is presented, as in the screen shown in FIG. 15.

When a teacher logs in using a guest ID in the above-described manner, the service of collectively managing a plurality of materials, as is provided by, for example, the management screen 320 shown in FIG. 4 when the registered teacher ID is used to log in, is not provided. On the other hand, similar services such as creation of materials or homework assignments and management of the submission status of the answers to the homework assignments are provided for individual materials. As in the above-described embodiment, by referring to the homework data management table 130, it is possible to obtain a URL corresponding to a homework ID that identifies a homework assignment for which submission state details are requested to be displayed. By referring to the homework submission management table 140, it is possible to obtain the number of items of "submitted" data for the homework ID, the "submitter name", and the "URL".

<Creation of Material by Teacher without Using Account (2)>

Figure 21:
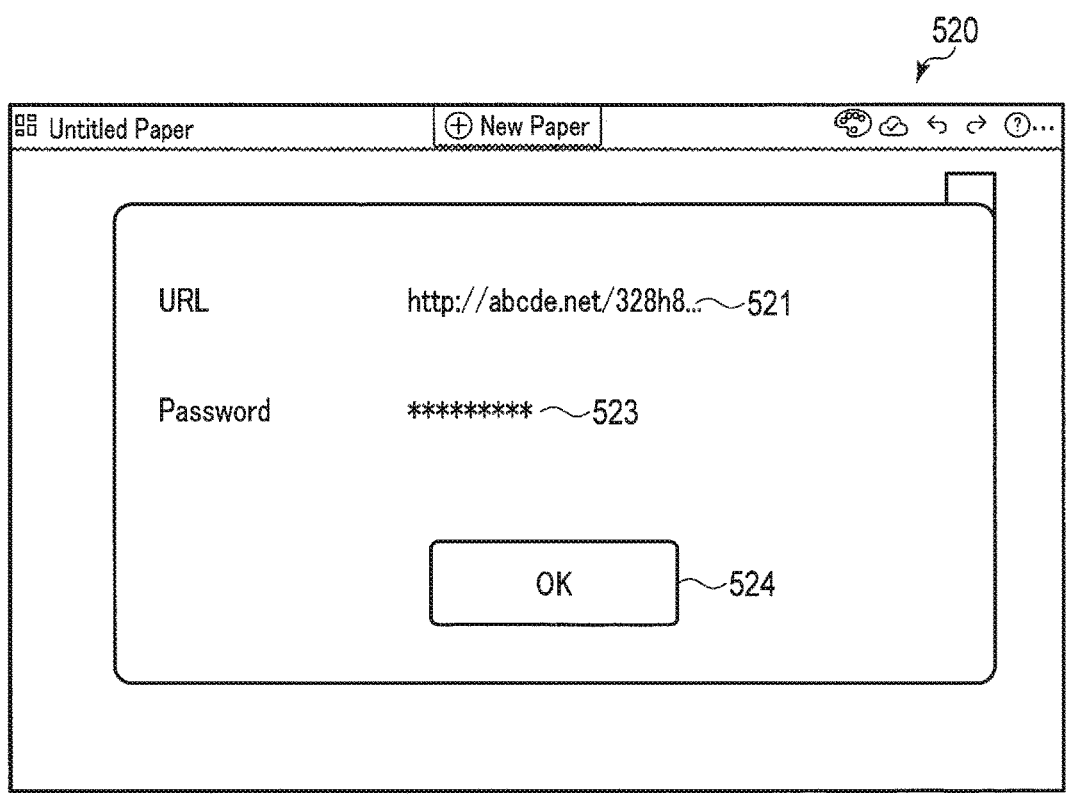
FIG. 21 is a diagram showing an example of an information presentation screen on which a URL, a password, etc. are displayed.

The web application of the present embodiment may be configured in such a manner that a teacher can create a material without having an account, including a guest ID. In this case, when access is made to a predetermined URL, a menu screen 410 as shown in FIG. 17 is displayed on the teacher's terminal. When create new 411 is selected, the processor 11 of the server 10 creates material data, and assigns, in association with the created material data, a URL and a password unique to the created material. These items of information are shown to the guest teacher on, for example, the information presentation screen 520 shown in FIG. 21. The information presentation screen 520 includes an indication 521 of the URL assigned to the material, an indication 523 of the password, and an OK icon 524 to close the information presentation screen 520. To edit a material, the guest teacher accesses the material data using the combination of URL and password shown thereon.

The data in the material data management table 510 and the homework data management table 530 created at this time is shown in FIG. 22. This data is the same as the data in the material data management table 110 and the homework data management table 130 of the case shown in FIG. 19, except that the teacher ID is not assigned and the teacher's password is assigned.

Figure 23:
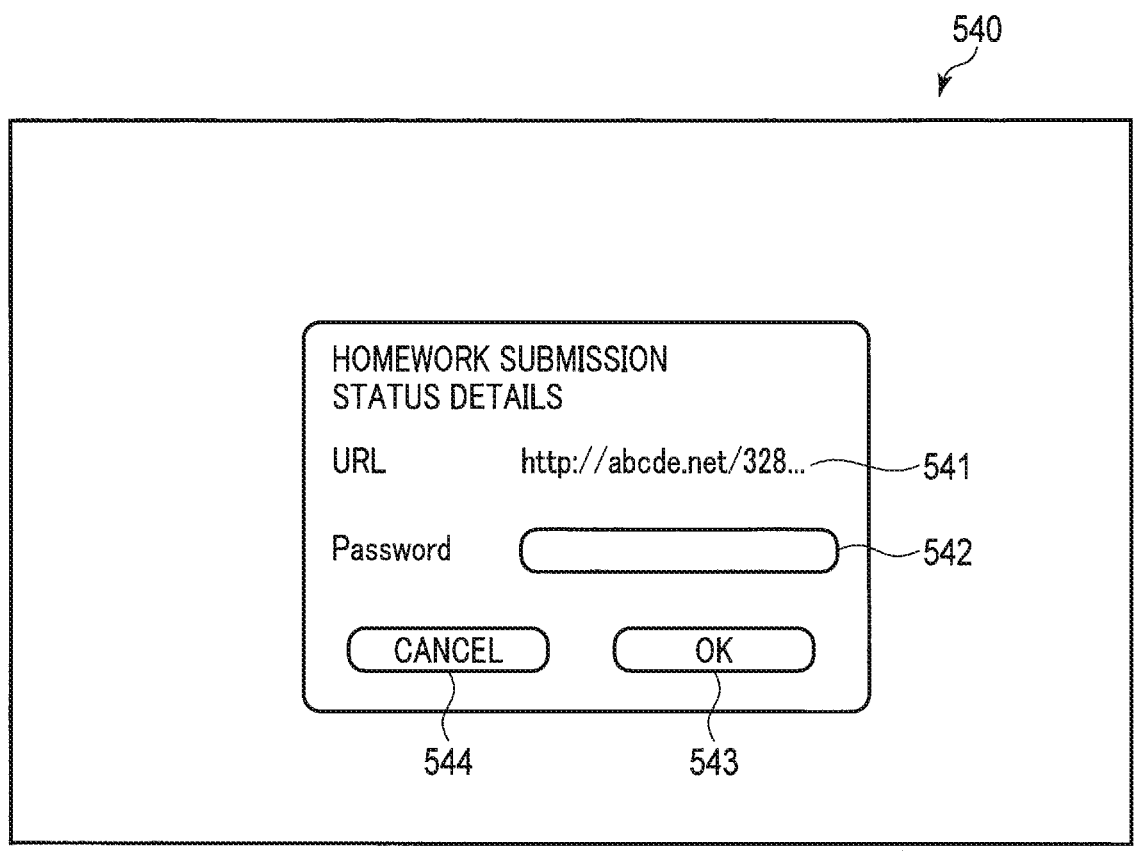
FIG. 23 is a diagram showing an example of an authentication screen displayed on the teacher's terminal for allowing a teacher without an account to confirm a homework submission status.

A website for allowing the guest teacher to confirm the homework submission status is also prepared. When the homework submission status 412 is selected on the menu screen 410 shown in FIG. 17, an authentication screen 540 as shown in FIG. 23 is displayed on the teacher's terminal. The guest teacher gains access to the homework data from the authentication screen 540. The authentication screen 540 includes a homework URL indication field 541, a teacher's password entry field 542, an OK icon 543, and a cancel icon 544. Using this screen, the server 10 requests the guest teacher to enter the teacher's password. If access is made to the homework data in the server 10 from this screen, the status of the homework data (assigned with the homework ID "H-83279") associated with the material ID "G0001-1" in the material data management table 510 and the homework data management table 530 in FIG. 22 are presented, as in the screen shown in FIG. 15.

When authentication is performed by a teacher not having any account including a guest ID in the above-described manner, the service of collectively managing a plurality of materials, as is provided by, for example, the management screen 320 shown in FIG. 4 when the registered teacher ID is used to log in, is not provided. On the other hand, similar services such as creation of materials and homework assignments and management of the submission statuses of the answers to the homework assignments are provided for individual materials. As in the above-described embodiment, by referring to the homework data management table 530, it is possible to obtain a URL corresponding to a homework ID that identifies a homework assignment for which submission state details are requested to be displayed. By referring to the homework submission management table 140, it is possible to obtain the number of items of "submitted" data for the homework ID, the "submitter name", and the "URL".

According to the present embodiment, it is possible to provide a web service that allows teachers to create materials or homework assignments, allows students to create and submit answers to homework assignments, and allows teachers to manage homework assignments to which answers have been submitted. This service can be used by teachers and students by using a terminal on which a web browser runs. Accordingly, this system can be easily installed.

According to this service, a student can create an answer, for example, by using an address and a password informed by a teacher in a classroom, without the need to have a unique account, etc. for using the service. Since a homework assignment is uniquely identified by the address and the password unique to the homework assignment given by the teacher, a student does not need to log in merely to answer the homework assignment. In other words, a student gains access to the homework assignment on an anonymous second terminal. That is, the web service can be used even on a second terminal that does not perform an authentication process using an ID for identifying a user who uses the web service. Accordingly, a load that would be incurred to manage the students' accounts is not generated. Even without having an account, a student can temporarily save, prior to submission, a homework assignment that is being created, and gains access to and edit the saved data again. By accessing the answer data, it is possible for a student not only to answer the homework assignment crated by a teacher, but also to utilize notes created by himself or herself for learning, for example. Issuing unique accounts to a number of students and having the accounts managed by the students or teachers are not feasible, taking into account the problems of leakage and loss of the accounts and/or the passwords, or may increase the time or cost for management. It is possible to provide a service that can be easily used by both teachers and students, while overcoming such disadvantages.

The data on materials and answers, for example, is protected by passwords. This prevents unauthorized access. In addition, since non-editable setting is suitably adopted, unauthorized alternation is prevented.

In the above-described embodiment, a case has been described where various processes are performed by the processor 11 of the server 10; however, the assignment of processing between the terminals and the server 10 may be suitably varied. For example, processing such as operations for the notes and indication may be performed by the terminals in accordance with the programs obtained from the server 10 and run on the terminals.

The present invention is not limited to the above-described embodiments, and can be modified in various manners in practice when implementing the invention without departing from the gist of the invention. Moreover, the embodiments can be suitably combined; in that case, the combined advantages are obtained. Furthermore, the above-described embodiments include various inventions, and various inventions can be extracted by a combination selected from structural elements disclosed herein. For example, if the object of the invention is achieved and the advantages of the invention are attained even after some of the structural elements disclosed in connection with the embodiments are deleted, the structure made up of the resultant structural elements can be extracted as an invention.

The invention claimed is:

1. A method executed by a server apparatus to provide a web service to at least a first client terminal and two second client terminals via a network, the method comprising:
    assigning a unique first address on the network to a first content created in response to a first operation made on the first client terminal;
    permitting access to the unique first address by each of the two second client terminals, each of which is anonymous and on each of which an authentication process with an ID that identifies a user who uses the web service is not performed;
    in response to permitting access to the unique first address, causing the first content to be displayed on each of the two second client terminals;
    in response to determining that the first content assigned with the unique first address has been edited by one of the second client terminals,
        assigning a unique second address on the network to a second content corresponding to the first content edited by the one of the second client terminals; and
        storing, in a storage, the second content in association with the unique second address;
    in response to determining that the first content assigned with the unique first address has been edited by another of the second client terminals,
        assigning a unique third address on the network to a third content corresponding to the first content edited by the another of the second client terminals; and
        storing, in the storage, the third content in association with the unique third address;
    permitting the first client terminal to access the second content through the second unique address, to access the third content through the third unique address, or both;
    in response to determining that the one of the second client terminals has indicated that the second content is in an edit completion state, storing, in the storage, the second content in a non-editable state in association with the unique second address and in association with information which indicates the edit completion state; and
    in response to determining that the another of the second client terminals has indicated that the third content is in the edit completion state, storing, in the storage, the third content in a non-editable state in association with the unique third address and in association with the information which indicates the edit completion state.

2. The method according to claim 1, further comprising:
    in response to a third operation made on the first client terminal, causing a display to display a submission status of the second content and the third content, and
    wherein the submission status of the second content and the third content comprises a number of the second content and the third content stored in the non-editable state in association with the information which indicates the edit completion state.

3. The method according to claim 2, further comprising:
    in response to a second operation made on the first client terminal to designate one of the unique second address and the unique third address, causing the display to display information on one of the second content and the third content corresponding to the one of the unique second address and the unique third address designated.

4. The method according to claim 2,
    wherein the submission status of the one of the second content and third content comprises the unique first address.

5. The method according to claim 2,
    wherein the submission status of the one of the second content and third content comprises the unique second address in a case where the second content is stored in association with the information which indicates the edit completion state.

6. The method according to claim 2,
    wherein the submission status of the one of the second content and third content comprises the unique third address in a case where the third content is stored in association with the information which indicates the edit completion state.

7. A non-transitory recording medium having a computer-readable program recorded thereon for providing a web service to at least a first client terminal and two second client terminals via a network, the computer-readable program causing one or more processors of an information processing apparatus to at least perform:
    assigning a unique first address on the network to a first content created in response to a first operation made on the first client terminal;
    permitting access to the unique first address by each of the two second client terminals, each of which is anonymous and on each of which an authentication process with an ID that identifies a user who uses the web service is not performed;
    in response to permitting access to the unique first address, causing the first content to be displayed on each of the two second client terminals;
    in response to determining that the first content assigned with the unique first address has been edited by one of the second client terminals,
        assigning a unique second address on the network to a second content corresponding to the first content edited by the one of the second client terminals; and
        storing, in a storage, the second content in association with the unique second address;
    in response to determining that the first content assigned with the unique first address has been edited by another of the second client terminals,
        assigning a unique third address on the network to a third content corresponding to the first content edited by the another of the second client terminals; and
        storing, in the storage, the third content in association with the unique third address;

permitting the first client terminal to access the second content through the second unique address, to access the third content through the third unique address, or both, in response to determining that the one of the second client terminals has indicated that the second content is in an edit completion state, storing, in the storage, the second content in a non-editable state in association with the unique second address and in association with information which indicates the edit completion state; and in response to determining that the another of the second client terminals has indicated that the third content is in the edit completion state, storing, in the storage, the third content in a non-editable state in association with the unique third address and in association with the information which indicates the edit completion state.

8. The non-transitory recording medium according to claim 7, the computer-readable program further causing the one or more processors to perform:

in response to a second operation made on the first client terminal, causing a display to display a submission status of the second content and the third content, and wherein the submission status of the second content and the third content comprises a number of the second content and the third content stored in the non-editable state in association with the information which indicates the edit completion state.

9. The non-transitory recording medium according to claim 8, the computer-readable program further causing the one or more processors to perform:

in response to a third operation made on the first client terminal to designate one of the unique second address and the unique third address, causing the display to display information on one of the second content and the third content corresponding to the one of the unique second address and the unique third address designated.

10. The non-transitory recording medium according to claim 7, wherein the submission status of the one of the second content and third content comprises the unique first address.

11. The non-transitory recording medium according to claim 7, wherein the submission status of the one of the second content and third content comprises the unique second address in a case where the second content is stored in association with the information which indicates the edit completion state.

12. The non-transitory recording medium according to claim 7, wherein the submission status of the one of the second content and third content comprises the unique third address in a case where the third content is stored in association with the information which indicates the edit completion state.

13. A server apparatus for providing a web service to at least a first client terminal and two second client terminals via a network, the server comprising one or more processors configured to:

assign a unique first address on the network to a first content created in response to a first operation made on the first client terminal;

permit access to the unique first address by each of the two second client terminals, each of which is anonymous and on each of which an authentication process with an ID that identifies a user who uses the web service is not performed;

in response to permitting access to the unique first address, cause the first content to be displayed on each of the two second client terminals;

in response to determining that the first content assigned with the unique first address has been edited by one of the second client terminals, assign a unique second address on the network to a second content corresponding to the first content edited by the one of the second client terminals; and store, in a storage, the second content in association with the unique second address;

in response to determining that the first content assigned with the unique first address has been edited by another of the second client terminals, assign a unique third address on the network to a third content corresponding to the first content edited by the another of the second client terminals; and store, in the storage, the third content in association with the unique third address;

permit the first client terminal to access the second content through the second unique address, to access the third content through the third unique address, or both;

in response to determining that the one of the second client terminals has indicated that the second content is in an edit completion state, store, in the storage, the second content in a non-editable state in association with the unique second address and in association with information which indicates the edit completion state; and in response to determining that the another of the second client terminals has indicated that the third content is in the edit completion state, store, in the storage, the third content in a non-editable state in association with the unique third address and in association with the information which indicates the edit completion state.

14. The server apparatus according to claim 13, wherein the one or more processors are configured to:

in response to a second operation made on the first client terminal, cause a display to display a submission status of the second content and the third content, and wherein the submission status of the second content and the third content comprises a number of the second content and the third content stored in the non-editable state in association with the information which indicates the edit completion state.

15. The server apparatus according to claim 14, wherein the one or more processors are configured to:

in response to a third operation made on the first client terminal to designate one of the unique second address and the unique third address, cause the display to display information on one of the second content and the third content corresponding to the one of the unique second address and the unique third address designated.

16. The server apparatus according to claim 13, wherein the submission status of the one of the second content and third content comprises the unique first address.

17. The server apparatus according to claim 13, wherein the submission status of the one of the second content and third content comprises the unique second address in a case where the second content is stored in association with the information which indicates the edit completion state.

18. The server apparatus according to claim 13,
wherein the submission status of the one of the second content and third content comprises the unique third address in a case where the third content is stored in association with the information which indicates the edit completion state.

\* \* \* \* \*